United States Patent
Damnjanovic et al.

(10) Patent No.: US 10,420,139 B2
(45) Date of Patent: Sep. 17, 2019

(54) UPLINK SCHEDULING FOR LICENSE ASSISTED ACCESS

(71) Applicant: QUALCOMM Incorporated, San Diego, CA (US)

(72) Inventors: Aleksandar Damnjanovic, Del Mar, CA (US); Srinivas Yerramalli, San Diego, CA (US); Peter Gaal, San Diego, CA (US); Tao Luo, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 120 days.

(21) Appl. No.: 15/414,045

(22) Filed: Jan. 24, 2017

(65) Prior Publication Data

US 2017/0230997 A1     Aug. 10, 2017

Related U.S. Application Data

(60) Provisional application No. 62/292,127, filed on Feb. 5, 2016.

(51) Int. Cl.
| | |
|---|---|
| *H04W 72/14* | (2009.01) |
| *H04W 28/26* | (2009.01) |
| *H04W 72/04* | (2009.01) |
| *H04W 72/10* | (2009.01) |

(Continued)

(52) U.S. Cl.
CPC ........... *H04W 72/14* (2013.01); *H04L 1/0031* (2013.01); *H04L 5/001* (2013.01); *H04L 5/005* (2013.01);

(Continued)

(58) Field of Classification Search
CPC . H04W 28/26; H04W 72/14; H04W 72/0413; H04W 72/10; H04W 74/04;

(Continued)

(56) References Cited

U.S. PATENT DOCUMENTS

| | | | |
|---|---|---|---|
| 8,774,819 B2 * | 7/2014 | Zhang | H04W 52/50 |
| | | | 455/452.1 |
| 2012/0182977 A1 | 7/2012 | Hooli et al. | |

(Continued)

FOREIGN PATENT DOCUMENTS

| | | |
|---|---|---|
| EP | 2536243 A1 | 12/2012 |
| EP | 2557883 A2 | 2/2013 |
| WO | WO-2011038780 A1 | 4/2011 |

OTHER PUBLICATIONS

International Search Report and Written Opinion—PCT/US2017/014861—ISA/EPO—dated May 22, 2017.

*Primary Examiner* — Ahmed Elallam
(74) *Attorney, Agent, or Firm* — Liem T. Do

(57) ABSTRACT

Uplink scheduling for license assisted access (LAA) mode systems is discussed in which a base station transmits a conditional grant to served user equipments (UEs) that include a transmission configuration for uplink transmissions. The transmission configuration includes the parameters necessary for the UE to perform transmissions. Before the beginning of a uplink transmission opportunity, a base station transmits an uplink activation grant over a contention-based shared carrier to the served UEs. The uplink activation grant indicates the transmission opportunity to the UEs and may identify a subset of UEs out of the served UEs that are available for transmission. The base station first secures the channel before transmitting the uplink activation grant. Upon receipt of the uplink activation grant, the UEs determine whether they will perform uplink transmissions and, if so, transmit the uplink data according to the transmission configuration.

36 Claims, 14 Drawing Sheets

(51) Int. Cl.
*H04L 5/00* (2006.01)
*H04L 1/00* (2006.01)
*H04W 74/00* (2009.01)
*H04L 1/18* (2006.01)
*H04W 16/14* (2009.01)
*H04W 28/08* (2009.01)
*H04W 74/08* (2009.01)

(52) U.S. Cl.
CPC ....... *H04W 28/26* (2013.01); *H04W 72/0413* (2013.01); *H04W 72/10* (2013.01); *H04W 74/006* (2013.01); *H04L 1/00* (2013.01); *H04L 1/1896* (2013.01); *H04L 5/00* (2013.01); *H04L 5/0044* (2013.01); *H04W 16/14* (2013.01); *H04W 28/08* (2013.01); *H04W 74/0808* (2013.01)

(58) Field of Classification Search
CPC ............. H04W 74/08; H04W 74/0808; H04W 74/0816; H04W 74/085; H04W 74/0825; H04W 74/0833; H04W 74/0841; H04W 74/0858; H04W 74/0866; H04W 74/0875; H04W 74/0891; H04W 76/00
See application file for complete search history.

(56) References Cited

U.S. PATENT DOCUMENTS

| | | | |
|---|---|---|---|
| 2014/0003387 A1* | 1/2014 | Lee | H04L 5/001 370/330 |
| 2014/0321391 A1* | 10/2014 | Zhang | H04W 52/50 370/329 |
| 2015/0103777 A1* | 4/2015 | Chen | H04W 76/15 370/329 |
| 2015/0163805 A1* | 6/2015 | Cattoni | H04W 74/006 370/329 |
| 2015/0172950 A1* | 6/2015 | Chen | H04W 16/14 370/252 |
| 2015/0181589 A1* | 6/2015 | Luo | H04B 7/0452 370/329 |
| 2015/0327245 A1* | 11/2015 | Zhu | H04W 72/02 370/329 |
| 2015/0334642 A1* | 11/2015 | Maaref | H04W 48/18 370/329 |
| 2015/0334643 A1* | 11/2015 | Maaref | H04W 48/18 370/329 |
| 2015/0350955 A1* | 12/2015 | Somasundaram | H04W 28/20 370/329 |
| 2016/0143064 A1* | 5/2016 | Cho | H04W 76/18 370/329 |
| 2017/0099664 A1* | 4/2017 | Lunttila | H04W 72/0446 |
| 2018/0048498 A1* | 2/2018 | Stern-Berkowitz | H04L 5/0048 |
| 2018/0049243 A1* | 2/2018 | Lee | H04W 74/0833 |
| 2018/0098353 A1* | 4/2018 | Lee | H04W 4/08 |
| 2018/0124825 A1* | 5/2018 | Lee | H04W 74/04 |
| 2018/0262945 A1* | 9/2018 | Yi | H04W 28/0278 |
| 2018/0317254 A1* | 11/2018 | Hu | H04W 16/14 |
| 2019/0069320 A1* | 2/2019 | Gao | H04W 72/14 |

\* cited by examiner

UPLINK SCHEDULING FOR LICENSE ASSISTED ACCESS

CROSS-REFERENCE TO RELATED APPLICATIONS

This application claims the benefit of U.S. Provisional Patent Application No. 62/292,127, entitled, UPLINK SCHEDULING FOR LICENSE ASSISTED ACCESS," filed on Feb. 5, 2016, which is expressly incorporated by reference herein in its entirety.

BACKGROUND

Field

Aspects of the present disclosure relate generally to wireless communication systems, and more particularly, to uplink scheduling for license assisted access (LAA).

Background

Wireless communication systems are widely deployed to provide various types of communication content, such as voice, video, packet data, messaging, broadcast, or the like. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, single-carrier frequency-division multiple access (SC-FDMA) systems, and orthogonal frequency-division multiple access (OFDMA) systems.

By way of example, a wireless multiple-access communication system may include a number of base stations, each simultaneously supporting communication for multiple communication devices, otherwise known as user equipment (UEs). A base station may communicate with UEs on downlink channels (e.g., for transmissions from a base station to a UE) and uplink channels (e.g., for transmissions from a UE to a base station).

Some modes of communication may enable communications between a base station and a UE over a contention-based shared radio frequency spectrum band, or over different radio frequency spectrum bands (e.g., a licensed radio frequency spectrum band or an unlicensed radio frequency spectrum band) of a cellular network. With increasing data traffic in cellular networks that use a licensed radio frequency spectrum band, offloading of at least some data traffic to an unlicensed radio frequency spectrum band may provide a cellular operator with opportunities for enhanced data transmission capacity. An unlicensed radio frequency spectrum band may also provide service in areas where access to a licensed radio frequency spectrum band is unavailable.

Prior to gaining access to, and communicating over, a contention-based shared radio frequency spectrum band, a base station or UE may perform a listen before talk (LBT) procedure to contend for access to the shared radio frequency spectrum band. An LBT procedure may include performing a clear channel assessment (CCA) procedure to determine whether a channel of the contention-based shared radio frequency spectrum band is available. When it is determined that the channel of the contention-based shared radio frequency spectrum band is available, a channel reserving signal, such as a channel usage beacon signal (CUBS) may be transmitted to reserve the channel.

SUMMARY

In one aspect of the disclosure, a method of wireless communication includes receiving a conditional grant including a transmission configuration for uplink transmissions, receiving an uplink activation grant over a contention-based shared carrier, wherein the uplink activation grant indicates an uplink transmission opportunity, and transmitting the uplink transmissions on the contention-based shared carrier according to the transmission configuration, wherein the transmitting is in response to the uplink activation grant.

In an additional aspect of the disclosure, an apparatus configured for wireless communication includes means for receiving a conditional grant including a transmission configuration for uplink transmissions, means for receiving an uplink activation grant over a contention-based shared carrier, wherein the uplink activation grant indicates an uplink transmission opportunity, and means for transmitting the uplink transmissions on the contention-based shared carrier according to the transmission configuration, wherein the means for transmitting is executed in response to the uplink activation grant.

In an additional aspect of the disclosure, a non-transitory computer-readable medium having program code recorded thereon. The program code further includes code to receive a conditional grant including a transmission configuration for uplink transmissions, code to receive an uplink activation grant over a contention-based shared carrier, wherein the uplink activation grant indicates an uplink transmission opportunity, and code to transmit the uplink transmissions on the contention-based shared carrier according to the transmission configuration, wherein the code to transmit is executed in response to the uplink activation grant.

In an additional aspect of the disclosure, an apparatus configured for wireless communication is disclosed. The apparatus includes at least one processor, and a memory coupled to the processor. The processor is configured to receive a conditional grant including a transmission configuration for uplink transmissions, to receive an uplink activation grant over a contention-based shared carrier, wherein the uplink activation grant indicates an uplink transmission opportunity, and to transmit the uplink transmissions on the contention-based shared carrier according to the transmission configuration, wherein the transmission is performed in response to the uplink activation grant.

In an additional aspect of the disclosure, a method of wireless communication includes receiving an uplink resource assignment assigning an interlace location for uplink transmissions on a contention-based shared carrier, performing a clear channel assessment (CCA) in a first symbol of a resource block of the interlace location, in response to detecting the CCA as successful, transmitting a sounding reference signal (SRS) according to a comb structure in a subsequent symbol of the resource block, wherein the comb structure transmits an SRS tone of the SRS in alternating tones of the plurality of tones of the subsequent symbol, and transmitting uplink information in one or more other remaining symbols of the resource block.

In an additional aspect of the disclosure, an apparatus configured for wireless communication includes means for receiving an uplink resource assignment assigning an interlace location for uplink transmissions on a contention-based shared carrier, means for performing a CCA in a first symbol of a resource block of the interlace location, means, executable in response to detecting the CCA as successful, for transmitting a SRS according to a comb structure in a subsequent symbol of the resource block, wherein the comb structure transmits an SRS tone of the SRS in alternating tones of the plurality of tones of the subsequent symbol, and means for transmitting uplink information in one or more other remaining symbols of the resource block.

In an additional aspect of the disclosure, a non-transitory computer-readable medium having program code recorded thereon. The program code further includes code to receive an uplink resource assignment assigning an interlace location for uplink transmissions on a contention-based shared carrier, code to perform a CCA in a first symbol of a resource block of the interlace location, code, executable in response to detecting the CCA as successful, to transmit a SRS according to a comb structure in a subsequent symbol of the resource block, wherein the comb structure transmits an SRS tone of the SRS in alternating tones of the plurality of tones of the subsequent symbol, and code to transmit uplink information in one or more other remaining symbols of the resource block.

In an additional aspect of the disclosure, an apparatus configured for wireless communication is disclosed. The apparatus includes at least one processor, and a memory coupled to the processor. The processor is configured to receive an uplink resource assignment assigning an interlace location for uplink transmissions on a contention-based shared carrier, to perform a CCA in a first symbol of a resource block of the interlace location, to transmit, in response to detecting the CCA as successful, a SRS according to a comb structure in a subsequent symbol of the resource block, wherein the comb structure transmits an SRS tone of the SRS in alternating tones of the plurality of tones of the subsequent symbol, and to transmit uplink information in one or more other remaining symbols of the resource block.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
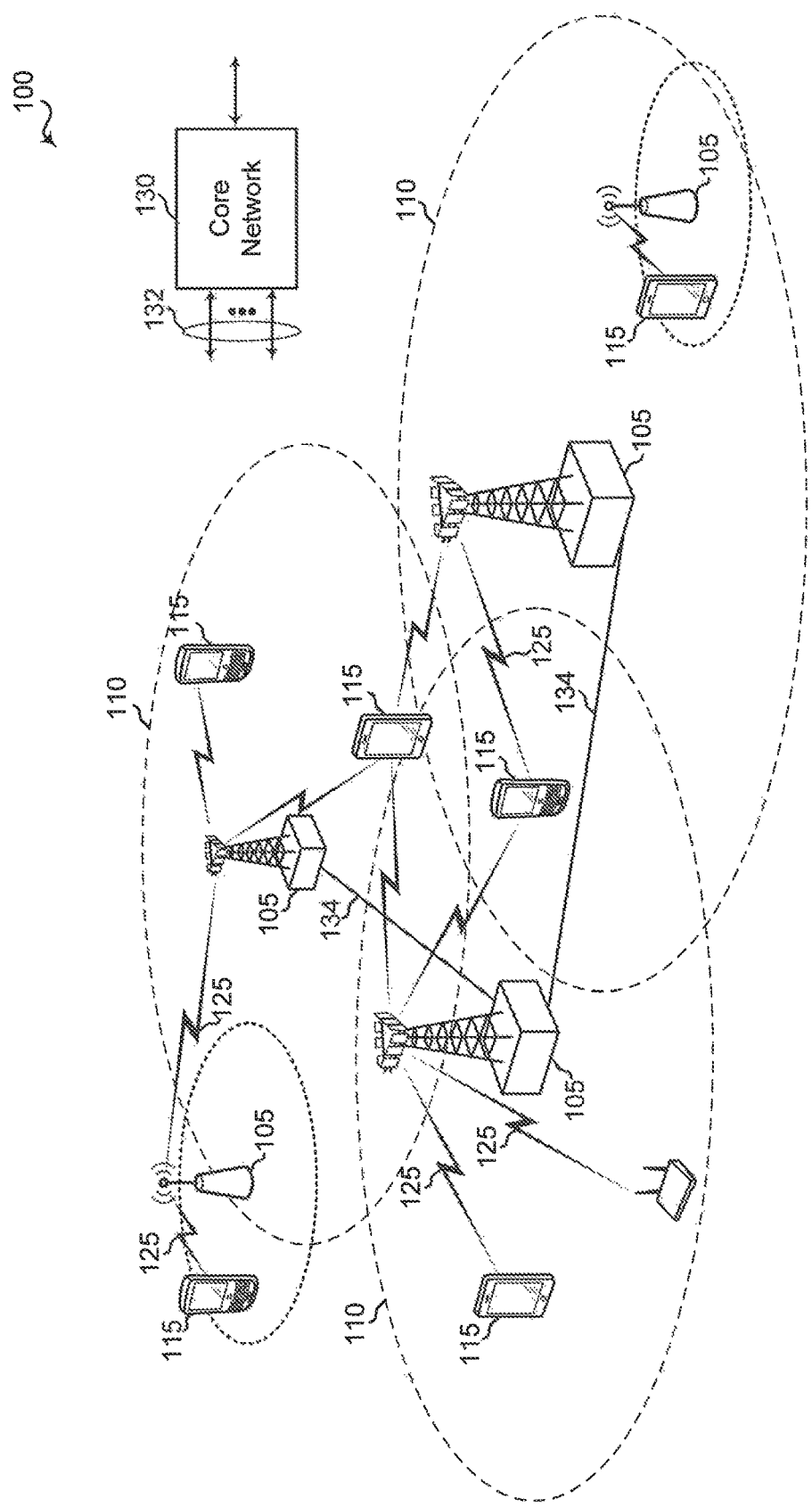
FIG. 1 shows a diagram that illustrates an example of a wireless communications system according to various embodiments.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

Techniques are described in which an unlicensed radio frequency spectrum band is used for at least a portion of contention-based communications over a wireless communication system. In some examples, a contention-based shared radio frequency spectrum band may be used for Long Term Evolution (LTE) communications or LTE-Advanced (LTE-A) communications. The contention-based radio frequency spectrum band may be used in combination with, or independent from, a non-contention licensed radio frequency spectrum band. In some examples, the contention-based radio frequency spectrum band may be a radio frequency spectrum band for which a device may also need to contend for access because the radio frequency spectrum band is available, at least in part, for unlicensed use, such as WiFi use.

With increasing data traffic in cellular networks that use a licensed radio frequency spectrum band, offloading of at least some data traffic to a contention-based shared radio frequency spectrum band, such as in an unlicensed band, may provide a cellular operator (e.g., an operator of a public land mobile network (PLMN) or a coordinated set of base stations defining a cellular network, such as an LTE/LTE-A network) with opportunities for enhanced data transmission capacity. As noted above, before communicating over a contention-based shared radio frequency spectrum band, such as unlicensed spectrum, devices may perform an LBT procedure to gain access to the shared radio frequency spectrum band. Such an LBT procedure may include performing a CCA procedure (or an extended CCA procedure) to determine whether a channel of the unlicensed radio frequency spectrum band is available. When it is determined that the channel of the contention-based radio frequency spectrum band is available, a channel reserving signal (e.g., a CUBS) may be transmitted to reserve the channel. When it is determined that a channel is not available, a CCA procedure (or extended CCA procedure) may be performed for the channel again at a later time.

When a base station and/or a UE includes multiple antenna ports capable of transmitting over the contention-based shared radio frequency spectrum band, transmissions from different antenna ports may interfere with one another due to correlation between transmitted signals. For a channel reserving signal used to reserve a channel of a contention-based shared radio frequency spectrum band, reduction of interference due to correlation between transmitted signals may be important to provide good detection capabilities for reserving the channel, and to prevent false detection that would unnecessarily reserve the channel and prevent other devices from using the channel. To reduce such interference due to cross-correlation of signals from different antennas or auto-correlation of a signal from a single antenna, the base station or the UE may generate a sequence based at least in part on an antenna port identifier associated with an antenna port that transmits the sequence of the channel reserving signal. In this way, correlation of channel reserving signals may be reduced, thereby improving detection capabilities of the signal transmission, resulting in more effective and accurate reservations of a channel of the contention-based shared radio frequency spectrum band.

In other words, for a channel reserving signal used to reserve a channel of an unlicensed radio frequency spectrum band, the channel reserving signal should be configured with good detectability to reduce false alarms, so that the channel reservation may be easily detected by other devices trying to access the shared radio frequency spectrum band. Thus, the channel reserving signal sequence should have good auto-correlation properties and good cross-correlation properties with sequences from neighbor base stations. For example, a primary synchronization signal (PSS), a secondary synchronization signal (SSS), and/or a channel state information-reference signal (CSI-RS) may not have good auto-correlation properties or good cross-correlation properties between different base stations in the contention-based shared radio frequency spectrum band. Thus, the channel reserving signal sequence should be configured based at least in part on an antenna port identifier to provide good auto-correlation and cross-correlation properties.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 is an illustration of an example wireless communication system 100, in accordance with various aspects of the present disclosure. The wireless communication system 100 may include base stations 105, UEs 115, and a core network 130. The core network 130 may provide user authentication, access authorization, tracking, Internet Protocol (IP) connectivity, and other access, routing, or mobility functions. The base stations 105 may interface with the core network 130 through backhaul links 132 (e.g., S1, etc.) and may perform radio configuration and scheduling for communication with the UEs 115, or may operate under the control of a base station controller (not shown). In various examples, the base stations 105 may communicate, either directly or indirectly (e.g., through core network 130), with other base stations 105 over backhaul links 134 (e.g., X2, etc.), which may be wired or wireless communication links.

The base stations 105 may wirelessly communicate with the UEs 115 via one or more base station antennas. Each of the base station 105 sites may provide communication coverage for a respective geographic coverage area 110. In some examples, a base station 105 may be referred to as a base transceiver station, a radio base station, an access point, a radio transceiver, a NodeB, an eNodeB (eNB), a Home NodeB, a Home eNodeB, or some other suitable terminology. The geographic coverage area 110 for a base station 105 may be divided into sectors making up a portion of the coverage area (not shown). The wireless communication system 100 may include base stations 105 of different types (e.g., macro or small cell base stations). There may be overlapping geographic coverage areas 110 for different technologies.

In some examples, the wireless communication system 100 may include an LTE/LTE-A network. In LTE/LTE-A networks, the term evolved Node B (eNB) may be used to describe the base stations 105, while the term UE may be used to describe the UEs 115. The wireless communication system 100 may be a Heterogeneous LTE/LTE-A network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may cover a relatively large geographic area (e.g., several kilometers in radius) and may allow unrestricted access by UEs with service subscriptions with the network provider. A small cell may be a lower-powered base station, as compared with a macro cell that may operate in the same or different (e.g., licensed, unlicensed, etc.) radio frequency spectrum bands as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communication system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARQ) to provide retransmission at the MAC layer to improve link efficiency. In the control plane, the Radio Resource Control (RRC) protocol layer may provide establishment, configuration, and maintenance of an RRC connection between a UE 115 and the base stations 105 or core network 130 supporting radio bearers for the user plane data. At the Physical (PHY) layer, the transport channels may be mapped to Physical channels.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations and network equipment, including macro eNBs, small cell eNBs, relay base stations, and the like.

The communication links 125 shown in wireless communication system 100 may include downlink (DL) transmissions, from a base station 105 to a UE 115, or uplink (UL) transmissions from a UE 115 to a base station 105. The downlink transmissions may also be called forward link transmissions, while the uplink transmissions may also be called reverse link transmissions. In some examples, UL transmissions may include transmissions of uplink control information, which uplink control information may be transmitted over an uplink control channel (e.g., a physical uplink control channel (PUCCH) or enhanced PUCCH (ePUCCH)). The uplink control information may include, for example, acknowledgements or non-acknowledgements of downlink transmissions, or channel state information. Uplink transmissions may also include transmissions of data, which data may be transmitted over a physical uplink shared channel (PUSCH) or enhanced PUSCH (ePUSCH). Uplink transmissions may also include the transmission of a sounding reference signal (SRS) or enhanced SRS (eSRS), a physical random access channel (PRACH) or enhanced PRACH (ePRACH) (e.g., in a dual connectivity mode or the standalone mode described with reference to FIGS. 2A and 2B), or a scheduling request (SR) or enhanced SR (eSR) (e.g., in the standalone mode described with reference to FIGS. 2A and 2B). References in this disclosure to a PUCCH, a PUSCH, a PRACH, an SRS, or an SR are presumed to inherently include references to a respective ePUCCH, ePUSCH, ePRACH, eSRS, or eSR.

In some examples, each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using a frequency domain duplexing (FDD) operation (e.g., using paired spectrum resources) or a time domain duplexing (TDD) operation (e.g., using unpaired spectrum resources). Frame structures for FDD operation (e.g., frame structure type 1) and TDD operation (e.g., frame structure type 2) may be defined.

In some aspects of the wireless communication system 100, base stations 105 or UEs 115 may include multiple antennas for employing antenna diversity schemes to improve communication quality and reliability between base stations 105 and UEs 115. Additionally or alternatively, base stations 105 or UEs 115 may employ multiple-input, multiple-output (MIMO) techniques that may take advantage of multi-path environments to transmit multiple spatial layers carrying the same or different coded data.

The wireless communication system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

The wireless communication system 100 may also or alternatively support operation over a non-contention licensed radio frequency spectrum band (e.g., a radio frequency spectrum band for which transmitting apparatuses may not contend for access because the radio frequency spectrum band is licensed to particular users for particular uses, such as a licensed radio frequency spectrum band usable for LTE/LTE-A communications) or a contention-based shared radio frequency spectrum band (e.g., an unlicensed radio frequency spectrum band for which transmitting apparatuses may need to contend for access because the radio frequency spectrum band is available for unlicensed use, such as WiFi use). Upon winning a contention for access to the contention-based shared radio frequency spectrum band, a transmitting apparatus (e.g., a base station 105 or UE 115) may transmit one or more channel reserving signals (e.g., one or more CUBS) over the unlicensed radio frequency spectrum band. The channel reserving signals may serve to reserve the unlicensed radio frequency spectrum by providing a detectable energy on the unlicensed radio frequency spectrum band. The channel reserving signals may also serve to identify a transmitting apparatus and/or a transmitting antenna, or may serve to synchronize the transmitting apparatus and a receiving apparatus. In some examples, a channel reserving signal transmission may commence at a symbol period boundary (e.g., an OFDM symbol period boundary). In other examples, a CUBS transmission may commence between symbol period boundaries.

The number and arrangement of components shown in FIG. 1 are provided as an example. In practice, wireless communication system 100 may include additional devices, fewer devices, different devices, or differently arranged devices than those shown in FIG. 1. Additionally, or alternatively, a set of devices (e.g., one or more devices) of wireless communication system 100 may perform one or more functions described as being performed by another set of devices of wireless communication system 100.

Figure 2A:
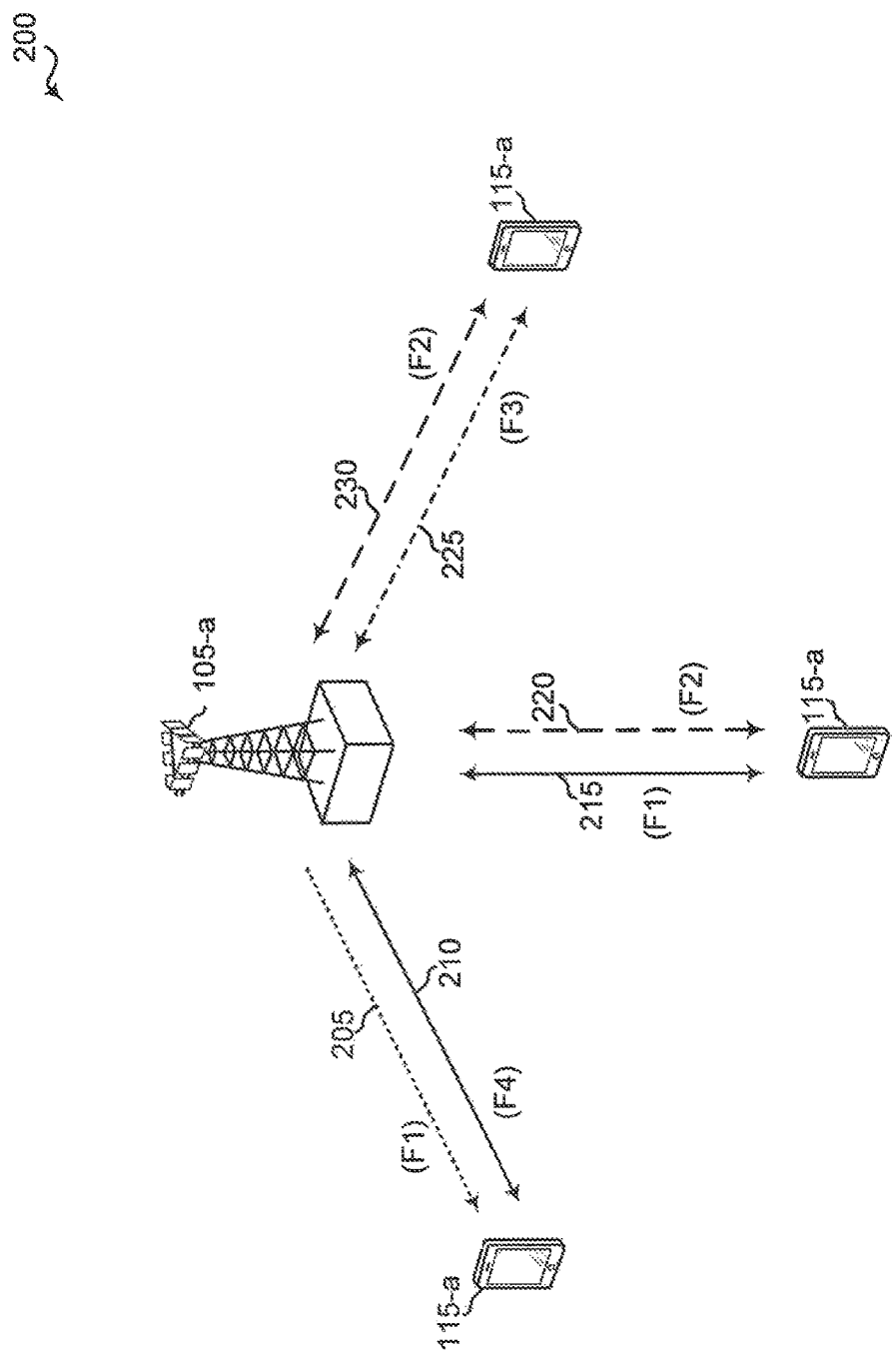
FIG. 2A shows a diagram that illustrates examples of deployment scenarios for using LTE in an unlicensed spectrum according to various embodiments.

Turning next to FIG. 2A, a diagram 200 shows examples of a supplemental downlink mode (e.g., licensed assisted access (LAA) mode) and of a carrier aggregation mode for an LTE network that supports LTE/LTE-A extended to contention-based shared spectrum. The diagram 200 may be an example of portions of the system 100 of FIG. 1. Moreover, the base station 105-*a* may be an example of the base stations 105 of FIG. 1, while the UEs 115-*a* may be examples of the UEs 115 of FIG. 1.

In the example of a supplemental downlink mode (e.g., LAA mode) in diagram 200, the base station 105-*a* may transmit communications signals to a UE 115-*a* using a downlink 205. The downlink 205 is associated with a frequency F1 in an unlicensed spectrum. The base station 105-*a* may transmit communications signals to the same UE 115-*a* using a bidirectional link 210 and may receive communications signals from that UE 115-*a* using the bidirectional link 210. The bidirectional link 210 is associated with a frequency F4 in a licensed spectrum. The downlink 205 in the unlicensed spectrum and the bidirectional link 210 in the licensed spectrum may operate concurrently. The downlink 205 may provide a downlink capacity offload for the base station 105-*a*. In some embodiments, the downlink 205 may be used for unicast services (e.g., addressed to one UE) services or for multicast services (e.g., addressed to several UEs). This scenario may occur with any service provider (e.g., traditional mobile network operator or MNO) that uses a licensed spectrum and needs to relieve some of the traffic and/or signaling congestion.

In one example of a carrier aggregation mode in diagram 200, the base station 105-*a* may transmit communications signals to a UE 115-*a* using a bidirectional link 215 and may receive communications signals from the same UE 115-*a* using the bidirectional link 215. The bidirectional link 215 is associated with the frequency F1 in the unlicensed spectrum. The base station 105-*a* may also transmit communications signals to the same UE 115-*a* using a bidirectional link 220 and may receive communications signals from the same UE 115-*a* using the bidirectional link 220. The bidirectional link 220 is associated with a frequency F2 in a licensed spectrum. The bidirectional link 215 may provide a downlink and uplink capacity offload for the base station 105-*a*. Like the supplemental downlink (e.g., LAA mode) described above, this scenario may occur with any service provider (e.g., MNO) that uses a licensed spectrum and needs to relieve some of the traffic and/or signaling congestion.

In another example of a carrier aggregation mode in diagram 200, the base station 105-*a* may transmit communications signals to a UE 115-*a* using a bidirectional link 225 and may receive communications signals from the same UE 115-*a* using the bidirectional link 225. The bidirectional link 225 is associated with the frequency F3 in an unlicensed spectrum. The base station 105-*a* may also transmit communications signals to the same UE 115-*a* using a bidirectional link 230 and may receive communications signals from the same UE 115-*a* using the bidirectional link 230. The bidirectional link 230 is associated with the frequency F2 in the licensed spectrum. The bidirectional link 225 may provide a downlink and uplink capacity offload for the base station 105-*a*. This example and those provided above are presented for illustrative purposes and there may be other similar modes of operation or deployment scenarios that combine LTE/LTE-A with or without contention-based shared spectrum for capacity offload.

As described above, the typical service provider that may benefit from the capacity offload offered by using LTE/LTE-A extended to contention-based spectrum is a traditional MNO with LTE spectrum. For these service providers, an operational configuration may include a bootstrapped mode (e.g., supplemental downlink (e.g., LAA mode), carrier aggregation) that uses the LTE primary component carrier (PCC) on the non-contention spectrum and the LTE secondary component carrier (SCC) on the contention-based spectrum.

In the supplemental downlink mode, control for LTE/LTE-A extended to contention-based spectrum may be transported over the LTE uplink (e.g., uplink portion of the bidirectional link 210). One of the reasons to provide downlink capacity offload is because data demand is largely driven by downlink consumption. Moreover, in this mode, there may not be a regulatory impact since the UE is not transmitting in an unlicensed spectrum. There is no need to implement listen-before-talk (LBT) or carrier sense multiple access (CSMA) requirements on the UE. However, LBT may be implemented on the base station (e.g., eNB) by, for example, using a periodic (e.g., every 10 milliseconds) clear channel assessment (CCA) and/or a grab-and-relinquish mechanism aligned to a radio frame boundary.

In the carrier aggregation mode, data and control may be communicated in LTE (e.g., bidirectional links 210, 220, and 230) while data may be communicated in LTE/LTE-A extended to contention-based shared spectrum (e.g., bidirectional links 215 and 225). The carrier aggregation mechanisms supported when using LTE/LTE-A extended to contention-based shared spectrum may fall under a hybrid frequency division duplexing-time division duplexing (FDD-TDD) carrier aggregation or a TDD-TDD carrier aggregation with different symmetry across component carriers.

Figure 2B:
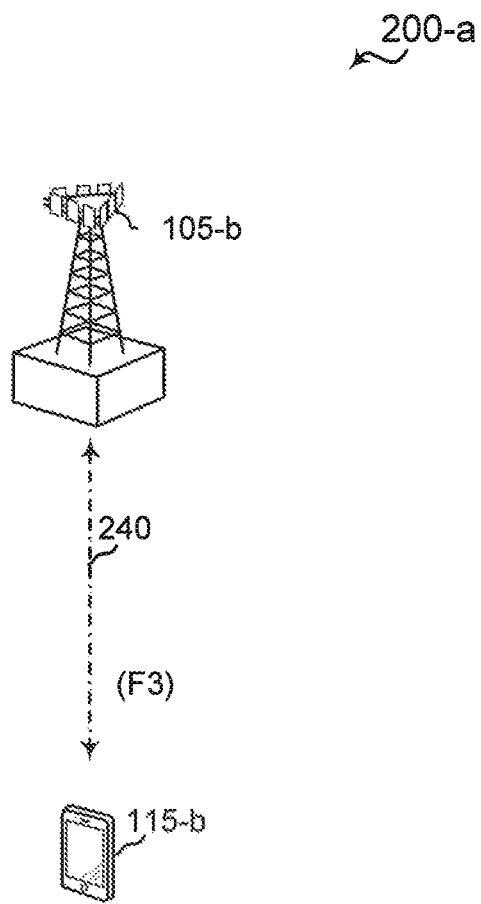
FIG. 2B shows a diagram that illustrates another example of a deployment scenario for using LTE in an unlicensed spectrum according to various embodiments.

FIG. 2B shows a diagram 200-*a* that illustrates an example of a standalone mode for LTE/LTE-A extended to contention-based shared spectrum. The diagram 200-*a* may be an example of portions of the system 100 of FIG. 1. Moreover, the base station 105-*b* may be an example of the base stations 105 of FIG. 1 and the base station 105-*a* of FIG. 2A, while the UE 115-*b* may be an example of the UEs 115 of FIG. 1 and the UEs 115-*a* of FIG. 2A.

In the example of a standalone mode in diagram 200-*a*, the base station 105-*b* may transmit communications signals to the UE 115-*b* using a bidirectional link 240 and may receive communications signals from the UE 115-*b* using the bidirectional link 240. The bidirectional link 240 is associated with the frequency F3 in a contention-based shared spectrum described above with reference to FIG. 2A. The standalone mode may be used in non-traditional wireless access scenarios, such as in-stadium access (e.g., unicast, multicast). An example of the typical service provider for this mode of operation may be a stadium owner, cable company, event hosts, hotels, enterprises, and large corporations that do not have licensed spectrum. For these service providers, an operational configuration for the standalone mode may use the PCC on the contention-based spectrum. Moreover, LBT may be implemented on both the base station and the UE.

In some examples, a transmitting apparatus such as one of the base stations 105 or 105-a described with reference to FIG. 1, 2A, or 2B, or one of the UEs 115, 115-a, or 115-b described with reference to FIG. 1, 2A, or 2B, may use a gating interval to gain access to a channel of a contention-based shared radio frequency spectrum band (e.g., to a physical channel of an unlicensed radio frequency spectrum band). In some examples, the gating interval may be periodic. For example, the periodic gating interval may be synchronized with at least one boundary of an LTE/LTE-A radio interval. The gating interval may define the application of a contention-based protocol, such as an LBT protocol based at least in part on the LBT protocol specified in European Telecommunications Standards Institute (ETSI) (EN 301 893). When using a gating interval that defines the application of an LBT protocol, the gating interval may indicate when a transmitting apparatus needs to perform a contention procedure (e.g., an LBT procedure) such as a clear channel assessment (CCA) procedure. The outcome of the CCA procedure may indicate to the transmitting apparatus whether a channel of a contention-based shared radio frequency spectrum band is available or in use for the gating interval (also referred to as an LBT radio frame). When a CCA procedure indicates that the channel is available for a corresponding LBT radio frame (e.g., "clear" for use), the transmitting apparatus may reserve or use the channel of the contention-based shared radio frequency spectrum band during part or all of the LBT radio frame. When the CCA procedure indicates that the channel is not available (e.g., that the channel is in use or reserved by another transmitting apparatus), the transmitting apparatus may be prevented from using the channel during the LBT radio frame.

The number and arrangement of components shown in FIGS. 2A and 2B are provided as an example. In practice, wireless communication system 200 may include additional devices, fewer devices, different devices, or differently arranged devices than those shown in FIGS. 2A and 2B.

Figure 3:
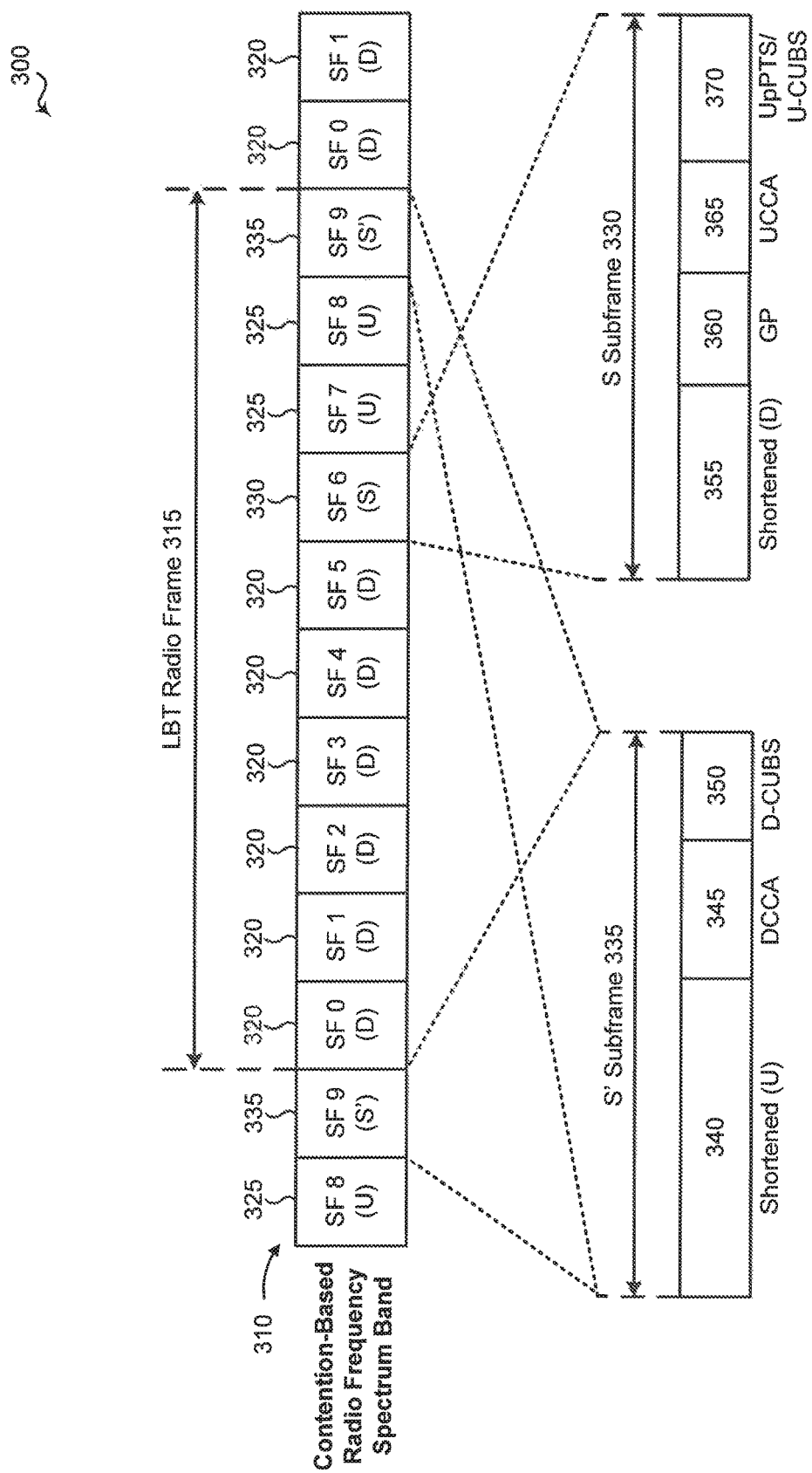
FIG. 3 is an illustration of an example of a wireless communication over an unlicensed radio frequency spectrum band, in accordance with various aspects of the present disclosure.

FIG. 3 is an illustration of an example 300 of a wireless communication 310 over an unlicensed radio frequency spectrum band, in accordance with various aspects of the present disclosure. In some examples, an LBT radio frame 315 may have a duration of ten milliseconds and include a number of downlink (D) subframes 320, a number of uplink (U) subframes 325, and two types of special subframes, an S subframe 330 and an S' subframe 335. The S subframe 330 may provide a transition between downlink subframes 320 and uplink subframes 325, while the S' subframe 335 may provide a transition between uplink subframes 325 and downlink subframes 320 and, in some examples, a transition between LBT radio frames.

During the S' subframe 335, a downlink clear channel assessment (CCA) procedure 345 may be performed by one or more base stations, such as one or more of the base stations 105, or 105-a described with reference to FIG. 1 or 2, to reserve, for a period of time, a channel of the contention-based shared radio frequency spectrum band over which the wireless communication 310 occurs. Following a successful downlink CCA procedure 345 by a base station, the base station may transmit a preamble, such as a channel usage beacon signal (CUBS) (e.g., a downlink CUBS (D-CUBS 350)) to provide an indication to other base stations or apparatuses (e.g., UEs, WiFi access points, etc.) that the base station has reserved the channel. In some examples, a D-CUBS 350 may be transmitted using a plurality of interleaved resource blocks. Transmitting a D-CUBS 350 in this manner may enable the D-CUBS 350 to occupy at least a certain percentage of the available frequency bandwidth of the contention-based shared radio frequency spectrum band and satisfy one or more regulatory requirements (e.g., a requirement that transmissions over an unlicensed radio frequency spectrum band occupy at least 80% of the available frequency bandwidth). The D-CUBS 350 may in some examples take a form similar to that of an LTE/LTE-A cell-specific reference signal (CRS) or a channel state information reference signal (CSI-RS). When the downlink CCA procedure 345 fails, the D-CUBS 350 may not be transmitted.

The S' subframe 335 may include a plurality of OFDM symbol periods (e.g., 14 OFDM symbol periods). A first portion of the S' subframe 335 may be used by a number of UEs as a shortened uplink (U) period 340. A second portion of the S' subframe 335 may be used for the downlink CCA procedure 345. A third portion of the S' subframe 335 may be used by one or more base stations that successfully contend for access to the channel of the contention-based shared radio frequency spectrum band to transmit the D-CUBS 350.

During the S subframe 330, an uplink CCA procedure 365 may be performed by one or more UEs, such as one or more of the UEs 115, 215, 215-a, 215-b, or 215-c described above with reference to FIG. 1, 2A, or 2B, to reserve, for a period of time, the channel over which the wireless communication 310 occurs. Following a successful uplink CCA procedure 365 by a UE, the UE may transmit a preamble, such as an uplink CUBS (U-CUBS 370) to provide an indication to other UEs or apparatuses (e.g., base stations, WiFi access points, etc.) that the UE has reserved the channel. In some examples, a U-CUBS 370 may be transmitted using a plurality of interleaved resource blocks. Transmitting a U-CUBS 370 in this manner may enable the U-CUBS 370 to occupy at least a certain percentage of the available frequency bandwidth of the contention-based radio frequency spectrum band and satisfy one or more regulatory requirements (e.g., the requirement that transmissions over the contention-based radio frequency spectrum band occupy at least 80% of the available frequency bandwidth). The U-CUBS 370 may in some examples take a form similar to that of an LTE/LTE-A CRS or CSI-RS. When the uplink CCA procedure 365 fails, the U-CUBS 370 may not be transmitted.

The S subframe 330 may include a plurality of OFDM symbol periods (e.g., 14 OFDM symbol periods). A first portion of the S subframe 330 may be used by a number of base stations as a shortened downlink (D) period 355. A second portion of the S subframe 330 may be used as a guard period (GP) 360. A third portion of the S subframe 330 may be used for the uplink CCA procedure 365. A fourth portion of the S subframe 330 may be used by one or more UEs that successfully contend for access to the channel of the contention-based radio frequency spectrum band as an uplink pilot time slot (UpPTS) or to transmit the U-CUBS 370.

In some examples, the downlink CCA procedure 345 or the uplink CCA procedure 365 may include the performance of a single CCA procedure. In other examples, the downlink CCA procedure 345 or the uplink CCA procedure 365 may include the performance of an extended CCA procedure. The extended CCA procedure may include a random number of CCA procedures, and in some examples may include a plurality of CCA procedures.

As indicated above, FIG. 3 is provided as an example. Other examples are possible and may differ from what was described in connection with FIG. 3.

Figure 4:
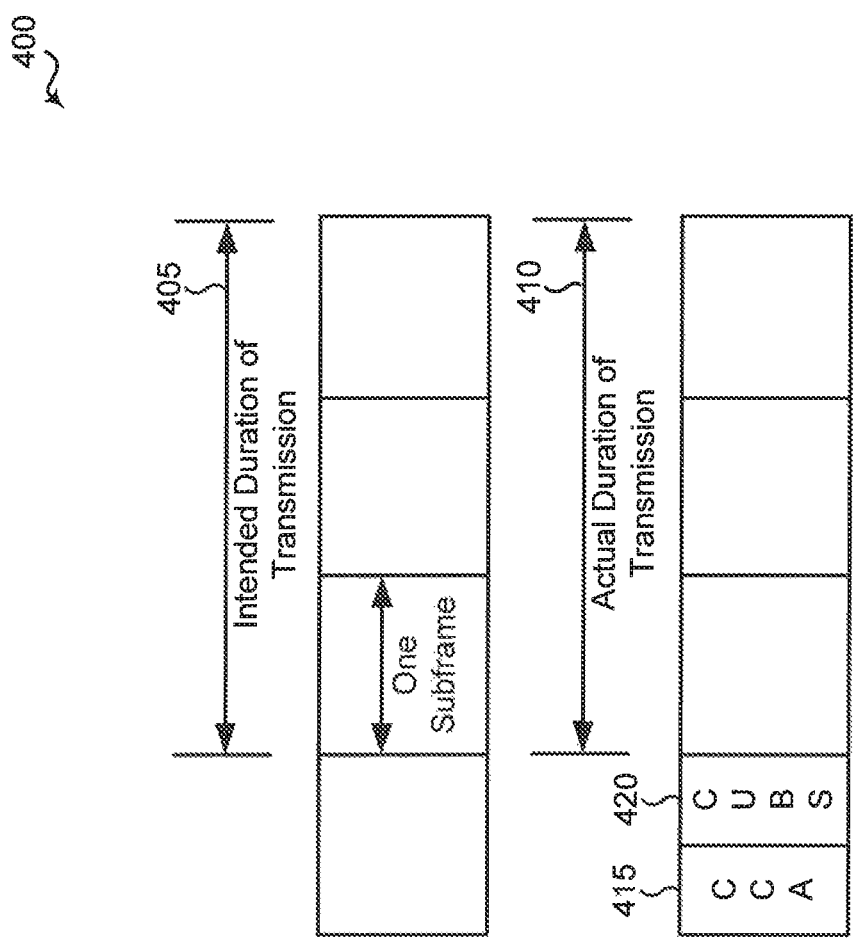
FIG. 4 is an illustration of an example of a CCA procedure performed by a transmitting apparatus when contending for access to a contention-based shared radio frequency spectrum band, in accordance with various aspects of the present disclosure.

FIG. 4 is an illustration of an example 400 of a CCA procedure 415 performed by a transmitting apparatus when contending for access to a contention-based shared radio frequency spectrum band, in accordance with various aspects of the present disclosure. In some examples, the CCA procedure 415 may be an example of the downlink CCA procedure 345 or uplink CCA procedure 365 described with reference to FIG. 3. The CCA procedure 415 may have a fixed duration. In some examples, the CCA procedure 415 may be performed in accordance with an LBT-frame based equipment (LBT-FBE) protocol (e.g., the LBT-FBE protocol described by EN 301 893). Following the CCA procedure 415, a channel reserving signal, such as a CUBS 420, may be transmitted, followed by a data transmission (e.g., an uplink transmission or a downlink transmission). By way of example, the data transmission may have an intended duration 405 of three subframes and an actual duration 410 of three subframes.

As indicated above, FIG. 4 is provided as an example. Other examples are possible and may differ from what was described in connection with FIG. 4.

Figure 5:
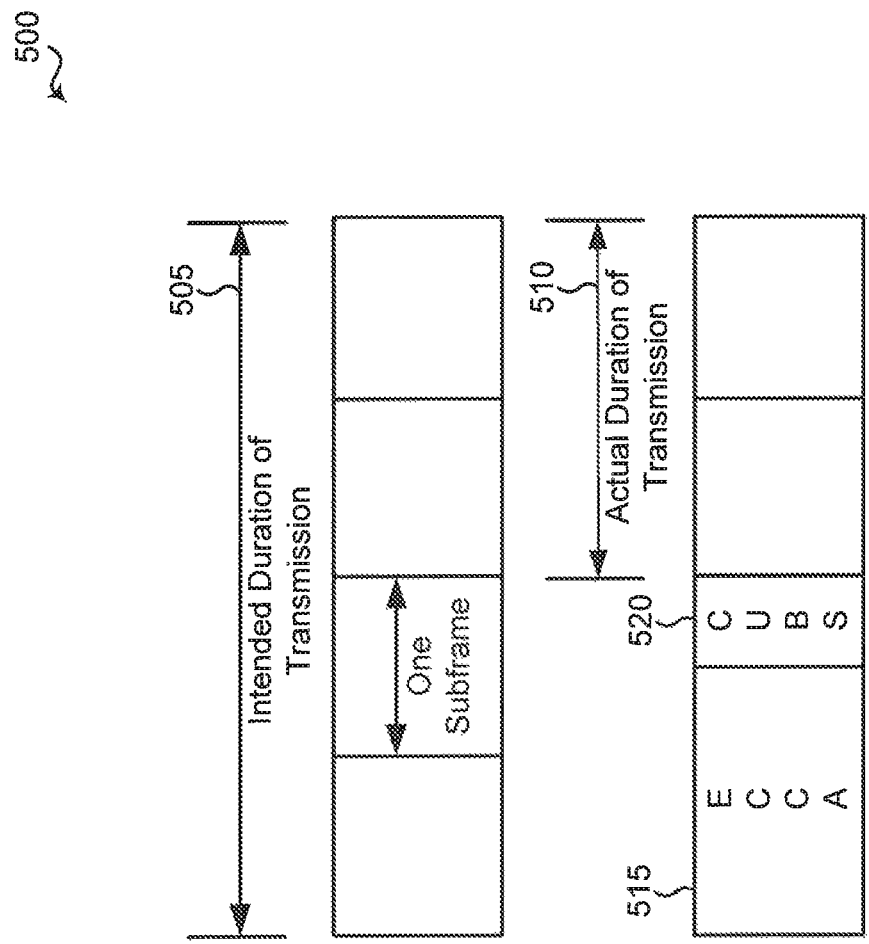
FIG. 5 is an illustration of an example of an extended CCA (ECCA) procedure performed by a transmitting apparatus when contending for access to a contention-based shared radio frequency spectrum band, in accordance with various aspects of the present disclosure.

FIG. 5 is an illustration of an example 500 of an extended CCA (ECCA) procedure 515 performed by a transmitting apparatus when contending for access to a contention-based shared radio frequency spectrum band, in accordance with various aspects of the present disclosure. In some examples, the ECCA procedure 515 may be an example of the downlink CCA procedure 345 or uplink CCA procedure 365 described with reference to FIG. 3. The ECCA procedure 515 may include a random number of CCA procedures, and in some examples may include a plurality of CCA procedures. The ECCA procedure 515 may, therefore, have a variable duration. In some examples, the ECCA procedure 515 may be performed in accordance with an LBT-load based equipment (LBT-LBE) protocol (e.g., the LBT-LBE protocol described by EN 301 893). The ECCA procedure 515 may provide a greater likelihood of winning contention to access the contention-based shared radio frequency spectrum band, but at a potential cost of a shorter data transmission. Following the ECCA procedure 515, a channel reserving signal, such as a CUBS 520, may be transmitted, followed by a data transmission. By way of example, the data transmission may have an intended duration 505 of three subframes and an actual duration 510 of two subframes.

As indicated above, FIG. 5 is provided as an example. Other examples are possible and may differ from what was described in connection with FIG. 5.

Figure 6:
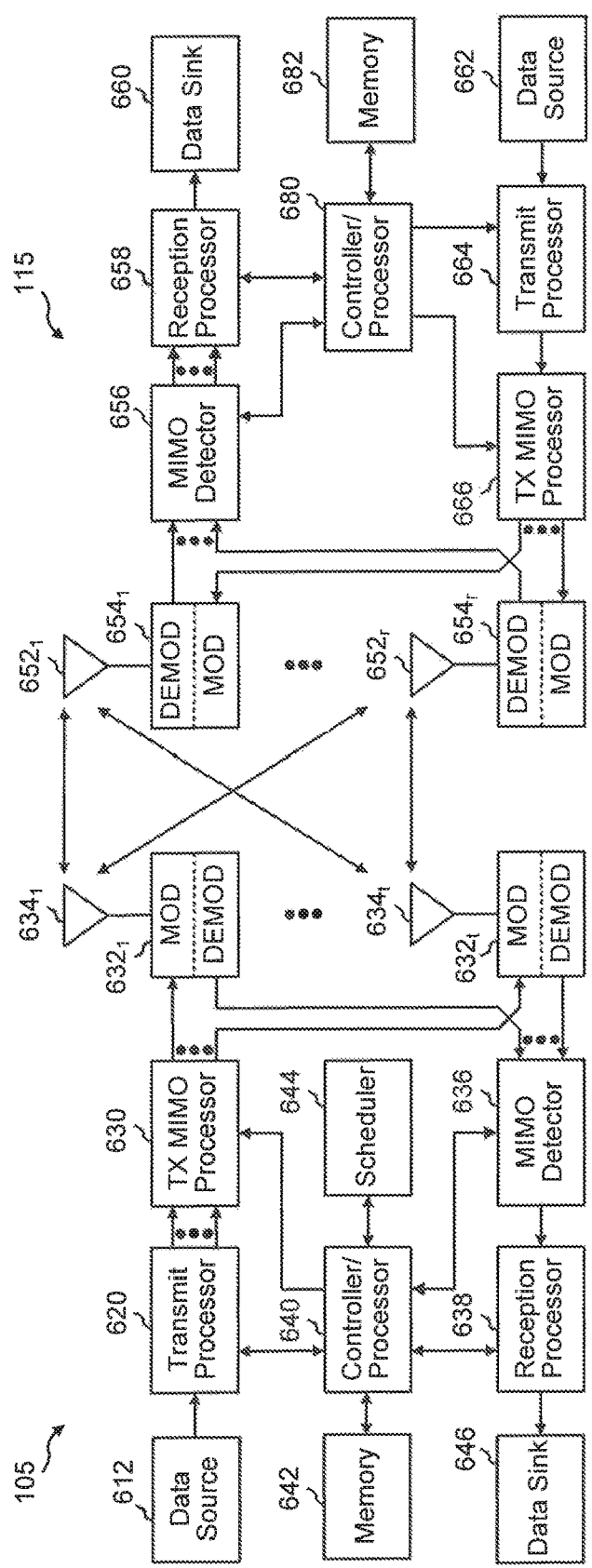
FIG. 6 shows a block diagram of a design of a base station/eNB and a UE, which may be one of the base stations/eNBs and one of the UEs in FIG. 1.

FIG. 6 shows a block diagram of a design of a base station/eNB 105 and a UE 115, which may be one of the base stations/eNBs and one of the UEs in FIG. 1. The eNB 105 may be equipped with antennas 634*a* through 634*t*, and the UE 115 may be equipped with antennas 652*a* through 652*r*. At the eNB 105, a transmit processor 620 may receive data from a data source 612 and control information from a controller/processor 640. The control information may be for the physical broadcast channel (PBCH), physical control format indicator channel (PCFICH), physical hybrid automatic repeat request indicator channel (PHICH), physical downlink control channel (PDCCH), etc. The data may be for the physical downlink shared channel (PDSCH), etc. The transmit processor 620 may process (e.g., encode and symbol map) the data and control information to obtain data symbols and control symbols, respectively. The transmit processor 620 may also generate reference symbols, e.g., for the primary synchronization signal (PSS), secondary synchronization signal (SSS), and cell-specific reference signal. A transmit (TX) multiple-input multiple-output (MIMO) processor 630 may perform spatial processing (e.g., precoding) on the data symbols, the control symbols, and/or the reference symbols, if applicable, and may provide output symbol streams to the modulators (MODs) 632*a* through 632*t*. Each modulator 632 may process a respective output symbol stream (e.g., for OFDM, etc.) to obtain an output sample stream. Each modulator 632 may further process (e.g., convert to analog, amplify, filter, and upconvert) the output sample stream to obtain a downlink signal. Downlink signals from modulators 632*a* through 632*t* may be transmitted via the antennas 634*a* through 634*t*, respectively.

At the UE 115, the antennas 652*a* through 652*r* may receive the downlink signals from the eNB 105 and may provide received signals to the demodulators (DEMODs) 654*a* through 654*r*, respectively. Each demodulator 654 may condition (e.g., filter, amplify, downconvert, and digitize) a respective received signal to obtain input samples. Each demodulator 654 may further process the input samples (e.g., for OFDM, etc.) to obtain received symbols. A MIMO detector 656 may obtain received symbols from all the demodulators 654*a* through 654*r*, perform MIMO detection on the received symbols if applicable, and provide detected symbols. A receive processor 658 may process (e.g., demodulate, deinterleave, and decode) the detected symbols, provide decoded data for the UE 115 to a data sink 660, and provide decoded control information to a controller/processor 680.

On the uplink, at the UE 115, a transmit processor 664 may receive and process data (e.g., for the physical uplink shared channel (PUSCH)) from a data source 662 and control information (e.g., for the physical uplink control channel (PUCCH)) from the controller/processor 680. The transmit processor 664 may also generate reference symbols for a reference signal. The symbols from the transmit processor 664 may be precoded by a TX MIMO processor 666 if applicable, further processed by the demodulators 654*a* through 654*r* (e.g., for SC-FDM, etc.), and transmitted to the eNB 105. At the eNB 105, the uplink signals from the UE 115 may be received by the antennas 634, processed by the modulators 632, detected by a MIMO detector 636 if applicable, and further processed by a receive processor 638 to obtain decoded data and control information sent by the UE 115. The processor 638 may provide the decoded data to a data sink 646 and the decoded control information to the controller/processor 640.

The controllers/processors 640 and 680 may direct the operation at the eNB 105 and the UE 115, respectively. The controller/processor 640 and/or other processors and modules at the eNB 105 may perform or direct the execution of various processes for the techniques described herein. The controllers/processor 680 and/or other processors and modules at the UE 115 may also perform or direct the execution of the functional blocks illustrated in FIG. 7, and/or other processes for the techniques described herein. The memories 642 and 682 may store data and program codes for the eNB 105 and the UE 115, respectively. A scheduler 644 may schedule UEs for data transmission on the downlink and/or uplink.

A device, such as a UE, may have multiple antennas (N) to use for receiving and/or transmitting signals. The device may divide the use and assignment of the antennas to use for particular radio access technologies (RATs), such as LTE, WiFi, etc., for particular carrier frequencies, or both. For example, in a CA scenario, the device may use a fixed number of antennas for one carrier. Conversely, the device may use a fixed number of antennas for WiFi when the device supports both WiFi and other technologies, such as LTE. In one example, a UE may have four antennas and assign two of the antennas for WiFi communication and two antennas for LTE communications. A device, such as a UE, may also dynamically or semi-statically select a number of antennas for one technology or one carrier (antenna selection). In such dynamic or semi-static schemes, the sharing or selection may be triggered by a particular measurement result, such as channel quality indicator (CQI), reference signal receive power (RSRP), and the like.

Communications networks, such as LTE, may have frequency division multiplexing (FDM) implementations and time division multiplexing (TDM) implementations. Sharing options in FDM implementations are not truly sharing different antennas, but rather sharing the frequency spectrum received over the antenna. For example, a UE may use a diplexer/switch in order to use all antennas at the same time for different air-interfaces. The diplexer/switch acts as a filter by filtering out the unwanted frequencies. However, in such FDM sharing schemes, there is typically a considerable loss in signal strength as the signals are filtered. Such losses can also increase with the higher frequency bands. TDM implementations may actually use or assign separate antennas for each air-interface/technology. Thus, when communications over such air-interfaces/technologies are not in use, those antennas that were assigned or designated for the unused communications may be shared with other air-interfaces/technologies. The various aspects of the present disclosure are directed to communication systems using TDM implementations.

In legacy LTE systems, scheduling of uplink transmission follows a grant timeline of n+4, where n represents the subframe in which the grant is transmitted. Thus, when an uplink grant is received at a UE in subframe n, the UE will transmit its uplink data after 4 subframes from the grant (n+4). While this uplink scheduling is sufficient for legacy LTE systems, it is not suitable for self-carrier scheduling either with heavy uplink traffic or where, as with communications over a contention-based shared carrier, the transmission opportunities are relatively short (e.g., <10 ms). Moreover, because of the LBT requirements in a contention-based shared carrier, a UE may not be able to secure the channel to transmit its uplink data at n+4.

In order to address these issues with uplink scheduling in LAA mode systems, several solutions have been proposed. For example, in a first proposed solution, after winning contention of a contention-based channel, the eNB transmits an uplink grant and stops transmitting on the channel. The UE would then perform a single CCA check and then begin uplink transmissions based on the grant. This solution is sometimes referred to as a paused transmission opportunity. However, during the paused transmission, there is an opportunity for another node to begin transmitting and secure the channel. Therefore, at n+4, the UE may not be able to transmit because of the other node's transmissions occupy the shared channel.

Another solution that has been proposed is to use cross-carrier uplink grants. For example, the uplink grant for the contention-based carrier is transmitted to the UE via the primary cell (PCell), which is a non-contention-based carrier. The UE would perform an ECCA before transmission. As with the paused transmission opportunity solution, concerns may arise with performance due to the presence of other nodes that may cause ECCA to fail. Additionally, as UEs successfully complete ECCAs, they may begin transmissions in the middle of a subframe. With the scheduled communications of the UEs, synchronization is important for maximizing uplink throughput. When UEs are grabbing a contention-based shared carrier in the middle of a subframe, they channel reserving signals may prevent other served UEs from passing an ECCA. The system becomes out of sync.

Figure 7:
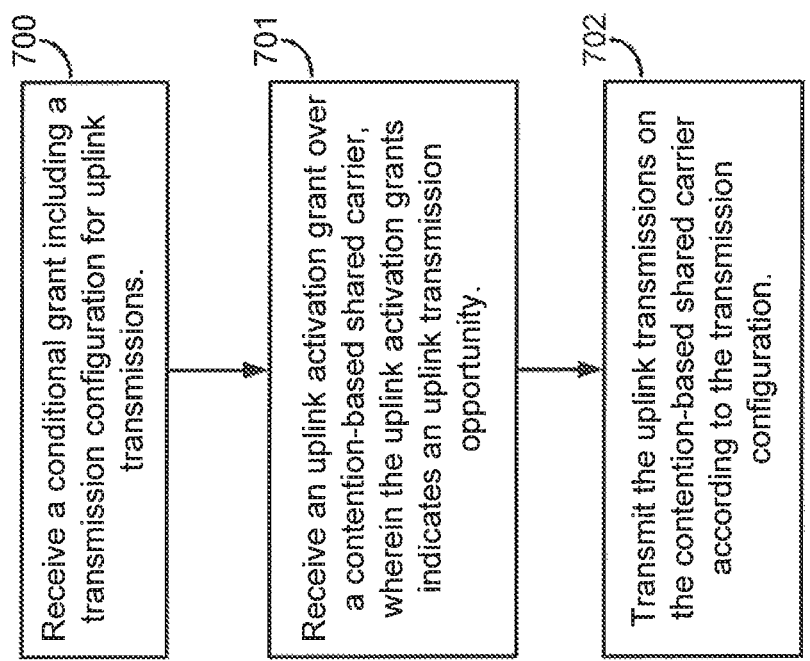
FIG. 7 is a block diagram illustrating example blocks executed to implement one aspect of the present disclosure.

FIG. 7 is a block diagram illustrating example blocks executed to implement one aspect of the present disclosure. At block 700, a UE receives a conditional grant including a transmission configuration for uplink transmissions. The various aspects of the present disclosure are directed to scheduling a conditional uplink transmission with a grant timeline greater than or equal to n+4 ($\geq$n+4). The conditional uplink grants may be transmitted on either the PCell (non-contention-based carrier) or SCell (contention-based carrier). The conditional uplink grant may also include the transmission configuration information used by a UE to perform the uplink communication, such as the modulation and coding scheme (MCS), resource allocation indication, number of interlaces, transport block size, hybrid automatic repeat request (HARQ) identifier (ID), redundancy level, and the like. When transmitted on the PCell, the UE would not be required to perform an ECCA because the conditional grant does not automatically trigger the uplink transmission process. It merely provides the configuration information that the UE may use to transmit when the transmission is triggered. Transmission of the conditional uplink grants on the PCell or SCell may be performed using single grant transmissions per subframe or may be transmitted using semi-persistent scheduling (SPS) scheduling, well ahead of any uplink transmission. Moreover, when transmitted on the SCell, conditional grants may also be transmitted over multiple transmission time intervals (TTIs). The UE may receive the conditional grant via either PDCCH or EPDCCH, regardless of any other control channel on the contention-based shared carrier on which downlink grants are carried.

At block 701, the UE receives an uplink activation grant over a contention-based shared carrier, wherein the uplink activation grant indicates an uplink transmission opportunity. The uplink activation grant is used by the SCell to indicate the beginning of the uplink transmission opportunity. The SCell would perform an ECCA to secure the contention-based channel, and, when the channel is secured with a successful ECCA, the SCell may transmit the uplink activation grant. In one aspect, the uplink activation grant may take the form of the common reference signal (CRS) transmitted by the SCell. In such case, any UEs served by the SCell would detect the CRS in symbol 0, which would implicitly indicate the transmission opportunity and activate the UE for uplink transmission. When a UE detects or receives the uplink activation grant, the UE applies the transmission configuration information received in conditional uplink grant communicated to the UE with the $\geq$n+4 timeline.

In additional aspects, the uplink activation grant may be a "common" uplink activation grant for more than one UE.

In such case, the common uplink activation grant may use a downlink control indicator (DCI) message (e.g., DCI format 1C, 3, and the like) that includes signaling for multiple UEs. For example, the indication in a common uplink activation grant may be configured as a bitmap in the DCI message. The position within the bitmap would correspond to a particular UE. The UEs may receive such information with regard to its corresponding bitmap position via higher layer signaling, such as via RRC signaling. Thus, the position in the bitmap indicates a given UE for transmission and allows for multiplexing of multiple UEs on the common uplink activation grant.

At block 702, the UE transmits the uplink transmissions on the contention-based shared carrier according to the transmission configuration. For example, if the bit corresponding to a particular UE is set, the corresponding UE applies the transmission configuration information provided in the conditional uplink grant and performs its uplink transmissions according to the transmission configuration. Otherwise, if the bit corresponding to a UE is not set, the corresponding UE would not transmit on PUSCH.

In additional aspects of the present disclosure, the uplink activation grant may also indicate the beginning and ending transmission period for one or more UEs or a group of UEs. For example, the uplink activation grant may implicitly identify to one or more UEs that they are to transmit only for a particular number of subframes or to delay for a particular number of subframes before beginning transmission. Alternatively, the uplink activation grant may include explicit signaling that identifies to one or a group of UEs exactly where within the next transmit opportunity the UE is expected to transmit.

Figure 8A:
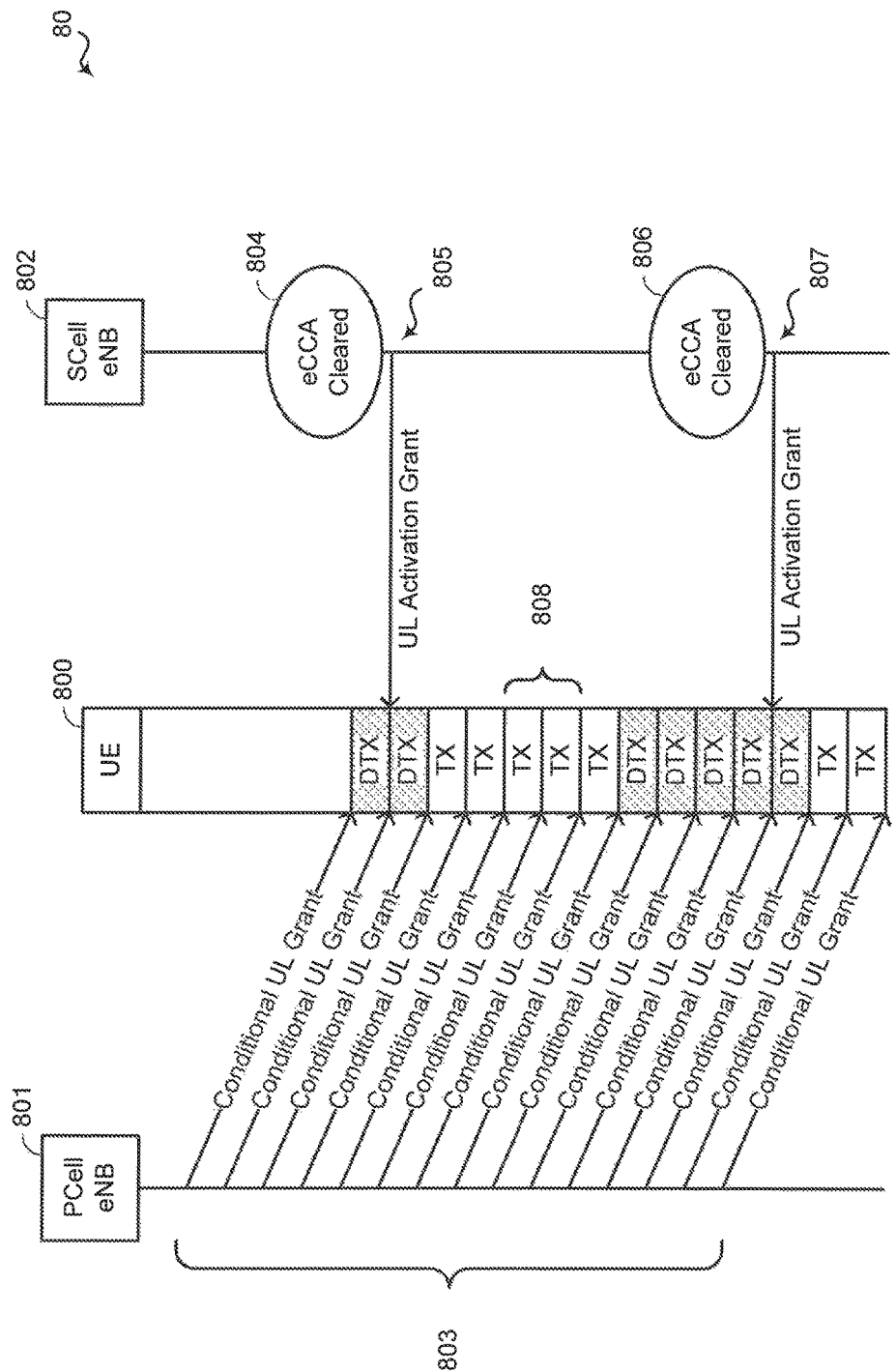
FIG. 8A is a block diagram illustrating an LAA communication system configured according to one aspect of the present disclosure with a PCell eNB and an SCell eNB serving a UE.

FIG. 8A is a block diagram illustrating an LAA communication system 80 configured according to one aspect of the present disclosure with PCell eNB 801 and SCell eNB 802 serving UE 800. PCell eNB 801 transmits conditional uplink grants 803 in single transmissions in each subframe. The conditional uplink grants include transmission configuration information, such as MCS, transport block size, resource allocations, and the like. UE 800 receives conditional uplink grants 803 and stores the transmission configuration for its uplink communications. In parallel, SCell eNB 802 performs an ECCA check on the contention-based shared carrier. After the ECCA check clears at 804, SCell eNB 802 transmits uplink activation grant 805 on the contention-based shared carrier. Each of the UEs within the coverage area of and served by SCell eNB 802 receives uplink activation grant 805. In the described aspect, uplink activation grant 805 includes a bitmap which identifies specific UEs within the group of UEs served by SCell eNB 802 that are activated for uplink transmissions in the next uplink transmission opportunity.

UE 800 receives the uplink activation grant 805 and identifies that its bit is set in the activation bitmap. In the next subframe, UE 800 transitions from not transmitting (DTX) to begin uplink transmissions (TX) according to the transmission configuration received from PCell eNB 801 in the corresponding conditional uplink grant 803. UE 800 will use the MCS, transport block size, etc., of the transmission configuration in performing its uplink transmissions on the contention-based shared carrier. UE 800 would not have to perform a CCA check first, as SCell eNB 802 has a successful ECCA at 804, signals uplink activation grant 805 and then immediately stops transmissions in order to allow UE 800, and any other UEs that have been activated for uplink transmission in uplink activation grant 805, to begin transmissions.

In one alternative aspect, uplink activation grant 805 includes an explicit signal to UE 800 that it is activated for uplink transmission at subframes 808. Thus, after receiving uplink activation grant 805, UE 800 uses the corresponding transmission configuration from conditional uplink grant 803 and then performs its uplink transmissions only within subframes 808. Other UEs served by SCell eNB 802 may be assigned for uplink transmissions during the other subframes of the uplink transmission opportunity identified by uplink activation grant 805.

UE 800 stops transmitting (DTX) again after the transmission opportunity. SCell eNB 802 performs another successful ECCA at 806. SCell eNB 802 will then transmit uplink activation grant 807, which may activate UE 800 to begin uplink transmissions again in the next subframe. Thus, the cross-carrier scheduling illustrated in FIG. 8A provides UE 800 with uplink transmission scheduling that follows a timeline of ≥n+4.

Figure 8B:
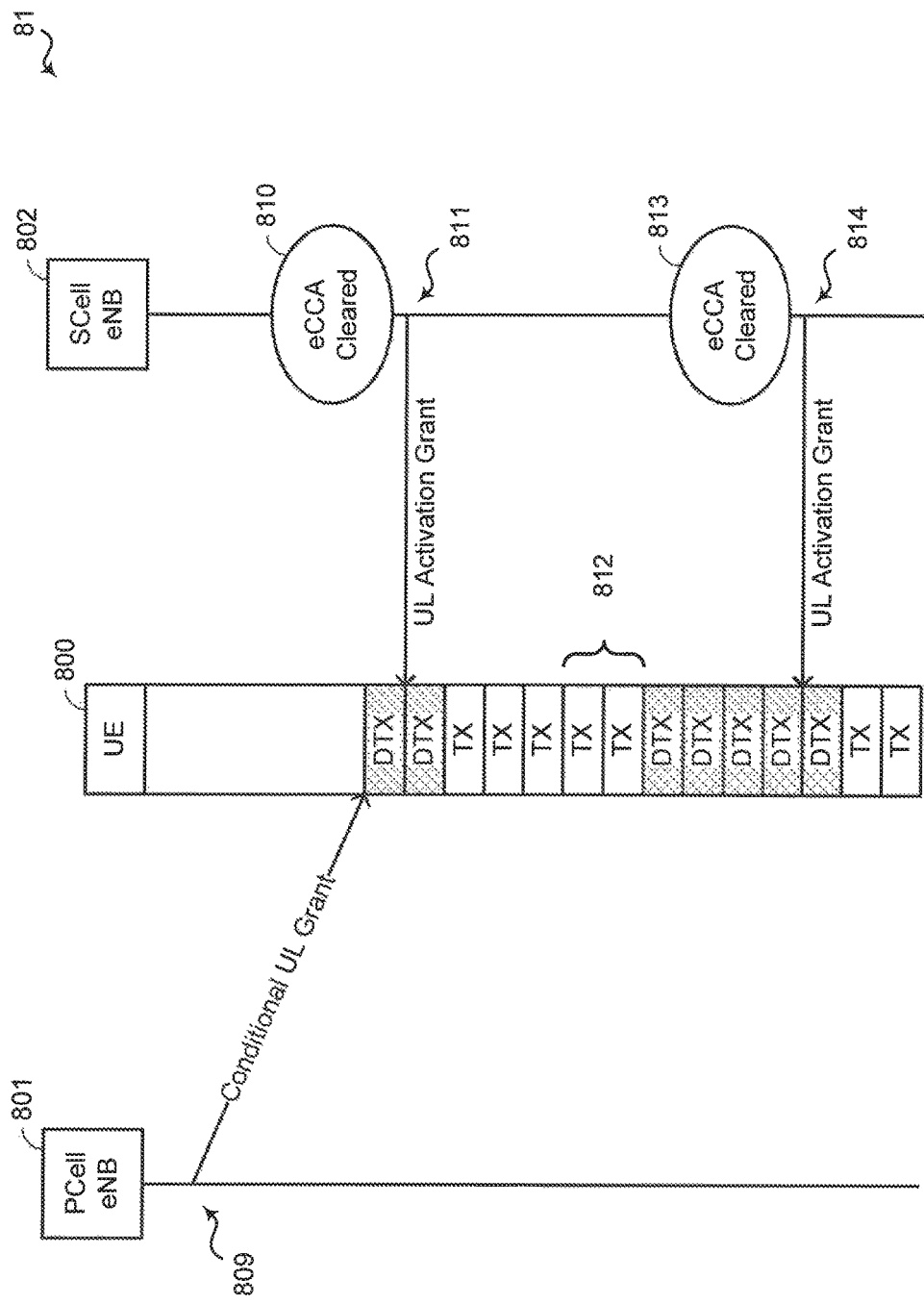
FIG. 8B is a block diagram illustrating an LAA communication system configured according to another aspect of the present disclosure with a PCell eNB and an SCell eNB serving a UE.

FIG. 8B is a block diagram illustrating an LAA communication system 81 configured according to one aspect of the present disclosure with PCell eNB 801 and SCell eNB 802 serving UE 800. Within LAA communication system 81, PCell eNB 801 uses a semi-persistent scheduling (SPS) conditional uplink grant 809 to provide the transmission configuration to the served UEs, including UE 800. Thus, the transmission configuration information, such as MCS, transport block size, resource allocation, etc., are transmitted well in advance of the potential uplink transmission opportunities.

Similar to the example aspect illustrated in FIG. 8A, SCell eNB 802 has successful ECCA checks at 810 and 813, and transmits uplink activation grants 811 and 814 to indicate to the UEs, such as UE 800, whether they are activated for transmission during the next transmit opportunity. Depending on whether UE 800 detects an indication for transmission in uplink activation grants 811 and 814, UE 800 will perform uplink transmissions according to the transmission configuration in conditional uplink grant 809. For example, an indication bit identifying UE 800 is activated in uplink activation grant 811, but not in uplink activation grant 814. Thus, UE 800 would perform uplink transmissions in the first transmit opportunity identified by uplink activation grant 811, but not in the next transmit opportunity identified by uplink activation grant 814.

In one alternative aspect, UE 800 has previously been configured to wait for three subframes before beginning uplink transmissions when receiving an uplink activation grant from SCell eNB 802. Thus, when UE 800 receives uplink activation grant 811 from SCell eNB 802, UE 800 waits the three subframes before beginning uplink transmissions on subframes 812 according to the transmission configuration. As such, the information contained within uplink activation grants 811 and 814 may implicitly trigger the uplink transmission schedule for the next transmit opportunity.

The UE may strictly follow the uplink grants in terms of time relationship when conditional uplink grant is valid. A conditional uplink grant is valid when the resulting transmission meets the ≥n+4 time line. However, various aspects of the present disclosure may provide for inclusion of a process identifier (ID) in the conditional individual or SPS uplink grant. The process ID may, in some aspects, be a hybrid automatic repeat request (HARQ) ID that identifies the particular subframe associated with the ID. In application, the UE receives the process ID in the conditional grant and may repeat the process ID, redundancy version, new data indicator, and the like, on the uplink transmission by puncturing symbols in the PUSCH transmission. The SCell would first detect for this punctured information in order to know what uplink transmissions to expect and then decode the remainder of the transmission. In this manner, multiple UEs may transmit on the same PUSCH with grants associated with different subframes. The embedded process ID allows the eNB to identify which subframe the associate uplink transmissions is associated with for proper decoding.

Figure 9:
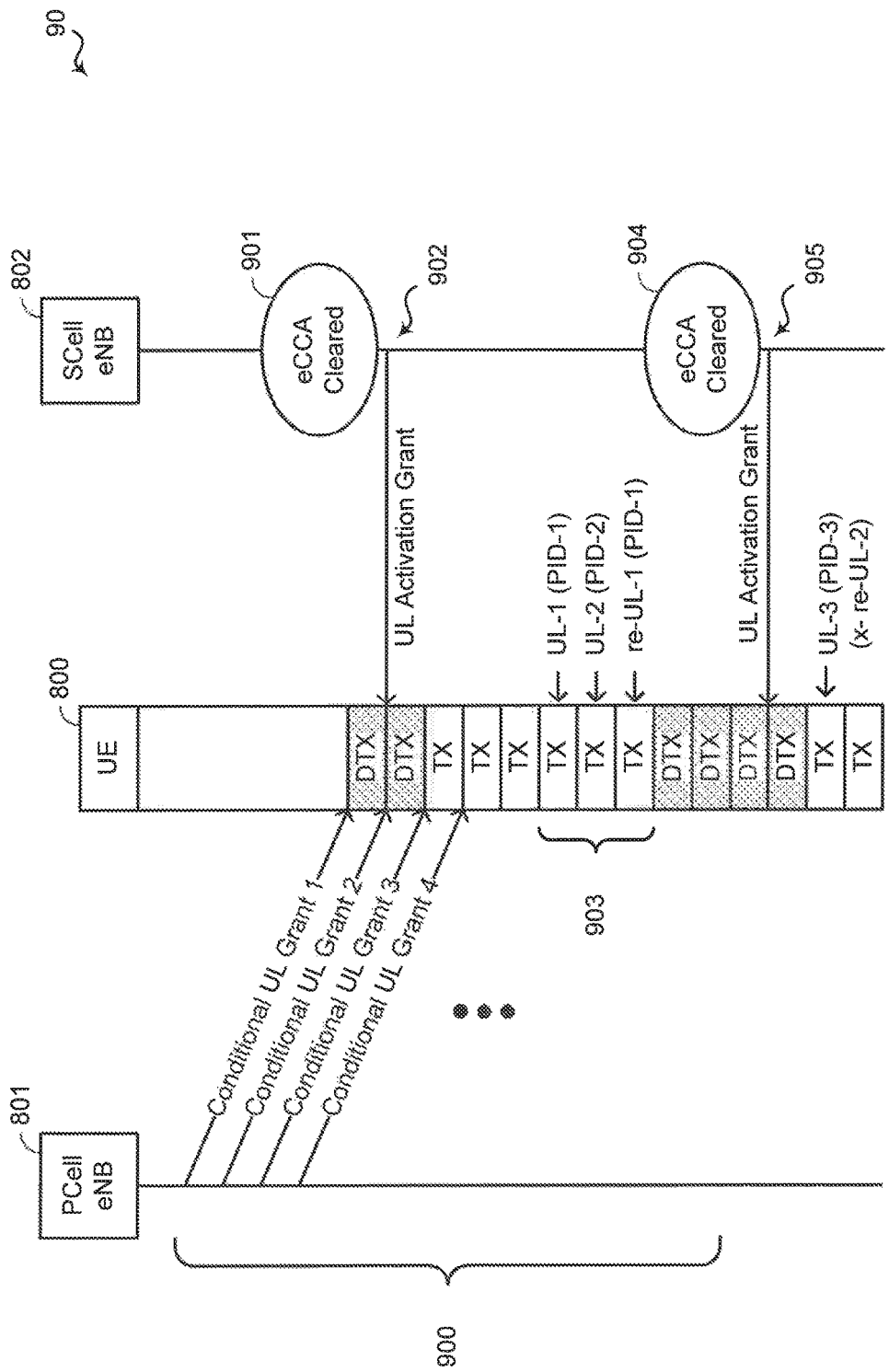
FIG. 9 is a block diagram illustrating an LAA communication system configured according to another aspect of the present disclosure with a PCell eNB and an SCell eNB serving a UE.

FIG. 9 is a block diagram illustrating an LAA communication system 90 configured according to one aspect of the present disclosure with PCell eNB 801 and SCell eNB 802 serving UE 800. PCell eNB 801 transmits conditional uplink grants 900 in each subframe to UE 800. The transmission configuration information transmitted with conditional uplink grants 900 not only includes information such as MCS, transport block size, resource assignment, etc., but also include a process ID associated with the transmission subframe. Thus, the subframe where the uplink transmission will occur for conditional uplink grant 1 will be associated with its own process ID (e.g., PID-1), and the like. The inclusion of the process ID also allows for a UE, such as UE 800, to exercise some autonomy in prioritizing transmissions for a given uplink transmission. For example, SCell eNB 802 detects a successful ECCA at 901 and transmits an uplink activation grant 902 which includes an uplink activation for UE 800 in the next uplink transmit opportunity. Based on explicit or implicit signaling, UE 800 performs its uplink transmissions at subframes 903.

In the first subframe of subframes 903, UE 800 prepares for uplink transmissions according to conditional uplink grant 1. Thus, UE 800 transmits the first uplink data (UL-1) and includes the process ID from conditional uplink grant 1 (PID-1). In the second subframe of subframes 903, UE 800 prepares for uplink transmissions according to conditional uplink grant 2. UE 800 transmits the second uplink data (UL-2) and includes PID-2. UE 800 determines that it will need to re-transmit the first uplink data (UL-1). At the third subframe of subframes 903, UE 800 would be scheduled for uplink transmissions according to conditional uplink grant 3. However, with a re-transmission of the first uplink data in UE 800's retransmission buffer, UE 800 first determines whether the transport block size associated with the first uplink data from conditional uplink grant 1 is the same as the transport block size associated with the third uplink transmission from conditional uplink grant 3. When the transport block sizes are the same, UE 800 prioritizes the re-transmission over the new data transmission. Thus, at the third subframe, UE 800 re-transmits the first uplink data along with the first process ID (PID-1) again. Because the transport block size associated with conditional uplink grants 1 and 3 are the same, SCell eNB 802 will be able to successfully decode the re-transmission of the first uplink data when it is expecting uplink transmissions according to conditional uplink grant 3. The transmission will also not have a new data indicator, thus, SCell eNB 802 will know it is a re-transmission. Because of the presence of PID-1, SCell eNB 802 will also know how to decode the transmission.

After the first uplink opportunity ends, SCell eNB 802 detects another successful ECCA check at 904 and transmits an uplink activation grant 905 to UE 800. Uplink activation grant 905 includes an uplink activation for UE 800 to begin uplink transmissions in the first subframe of the next transmit opportunity. UE 800 determines that it will have to re-transmit the second uplink data transmitted in the previous transmit opportunity. However, upon comparison of the transport block size associated with conditional uplink grant 2 with the transport block size associated with conditional uplink grant 3, the two sizes are not the same. As such, UE 800 may not prioritize the re-transmission of the second uplink data over the new data for transmission in the third uplink data. UE 800, therefore, transmits the third uplink data with the process ID received with conditional uplink grant 3 (PID-3).

In addition to comparing the transport block sizes between two different uplink transmission configuration assignments, various aspects of the present disclosure may also provide for the UE to confirm that the MCS and resource block assignments are also the same before electing such a prioritization.

Figure 10:
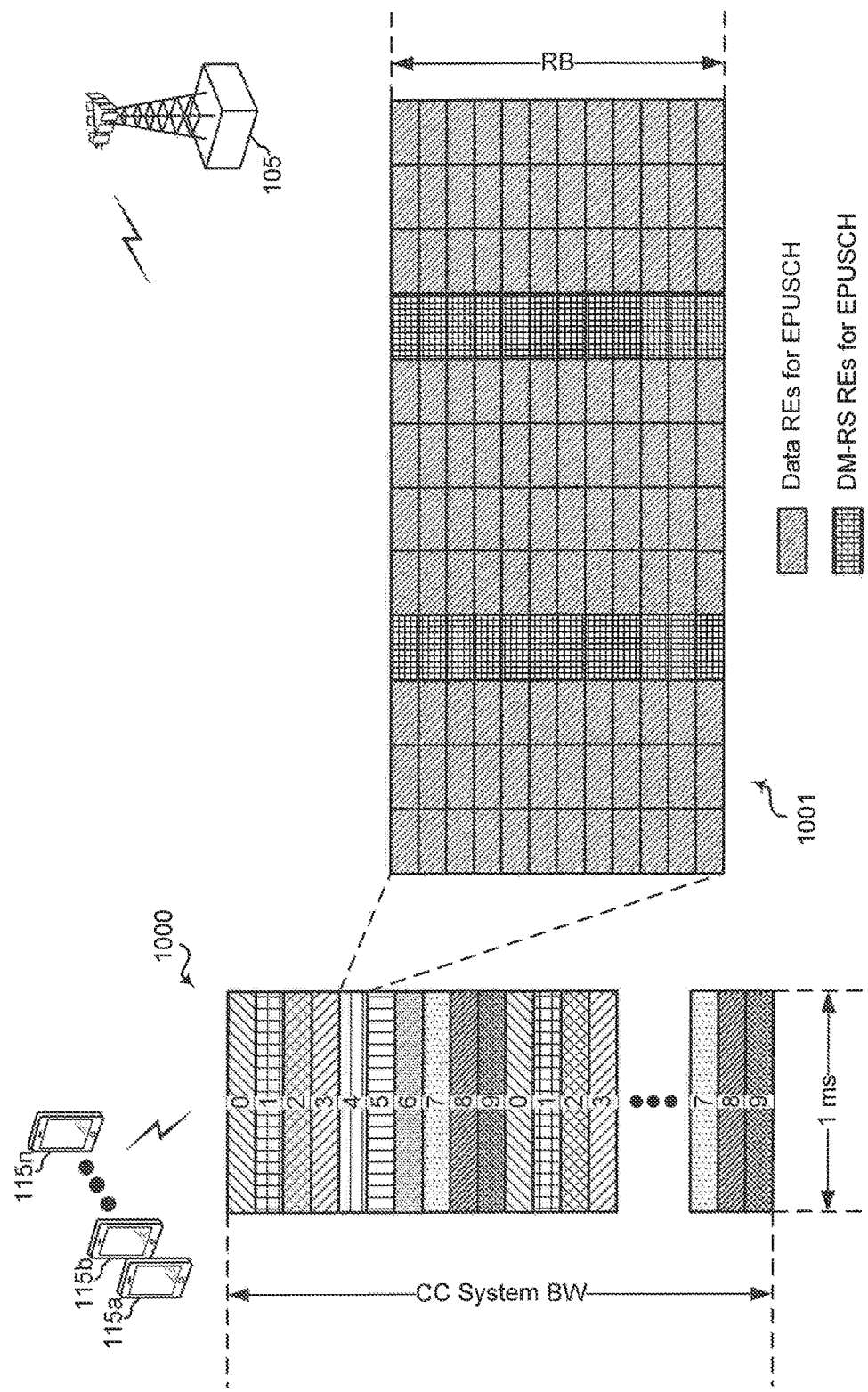
FIG. 10 is a block diagram illustrating UEs and eNB in an LAA mode system configured according to an additional aspect of the present disclosure.

FIG. 10 is a block diagram illustrating UEs 115a-n and eNB 105 in an LAA mode system configured according to an additional aspect of the present disclosure. Wireless communication systems in an LAA mode may also include various additional features for communication and transmission of sounding reference signals (SRS). In LAA mode systems, uplink PUSCH and PUCCH transmissions may be based on an interlace structure 1000. Such interlace structure 1000, in which RBs are uniformly spaced in frequency allows each of UEs 115a-n to transmit at almost peak power and still satisfy the power spectral density constraint imposed by regulation. For example, resource block 1001 of interlace structure 100 provides for UE 115b to transmit data REs for enhanced PUSCH (EPUSCH) and demodulation reference signals (DM-RS) REs for EPUSCH.

In interlace structure 1000, the minimum transmission unit is one interlace, with a set of RBs uniformly spaced in frequency to span the entire bandwidth. For example, in a 20 MHz system with 100RBs, the $i^{th}$ interlace is comprised of the RBs $\{i, i+10, i+20, \ldots i+90\}$. Thus, a 20 MHz system would have a total of 10 interlaces in the uplink which can be shared among the users. LAA systems with different system bandwidths may have different numbers of interlaces for uplink that can be shared among users.

Such an interleaved structure 1000 allows UEs to occupy each MHz of spectrum with at least one RB and use power boosting to transmit at full power in the contention-based shared spectrum, thus, improving coverage. The ability to transmit at full power also has the benefit of silencing more interferers than transmission at lower power and improving the reception at the eNB receiver and also automatically satisfying the 80% bandwidth occupancy requirement on the order of a few μsec. This also improves coexistence as narrow band transmissions on the unlicensed channels can impact coexistence. Because the RBs of each interlace are spaced uniformly in frequency, transmission on one or more of the interlaces may provide an effective mechanism to sound the uplink channel.

Additional aspects of the present disclosure are related to an interlace plus comb-based transmission in which every alternative tone in a given RB of an interlace is occupied by a given UE. In such an aspect, multiple UEs may be multiplexed in frequency on the same interlace, thus, increasing the capacity of SRS.

Figure 11:
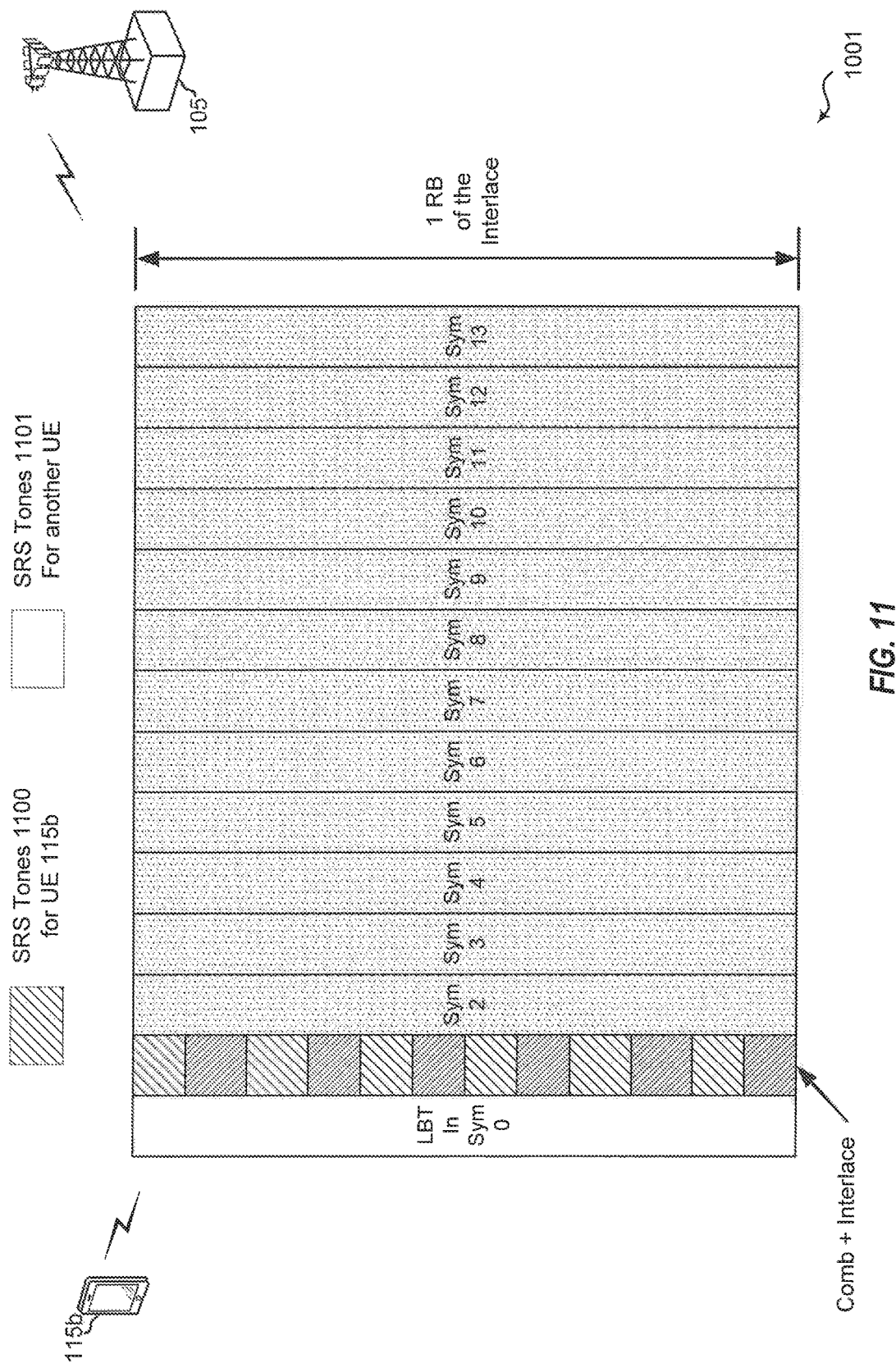
FIG. 11 is a block diagram illustrating an interlace resource block configured in an LAA mode system with a UE and eNB configured according to one aspect of the present disclosure.

FIG. 11 is a block diagram illustrating an interlace resource block 1001 configured in an LAA mode system with UE 115b and eNB 105 configured according to one aspect of the present disclosure. In general, there are several types of UEs whose PUSCH and PUCCH may be scheduled in a given subframe: (1) UEs which transmit SRS along with PUSCH; (2) UEs which transmit only SRS but not PUSCH and PUCCH; (3) UEs which transmit only PUSCH without SRS; (4) UEs which only transmit PUCCH; and (5) UEs which may transmit PUCCH and SRS. In order to satisfy the operations of each of these types of UEs, the SRS may be transmitted in a comb structure in a symbol after the first symbol, on which an LBT action, such as a CCA check, is performed in a subframe.

As illustrated in FIG. 11, UE 115b performs a CCA check in symbol 0 of interlace resource block 1001, and, if successful, transmits SRS tones in a comb structure on symbol 1. The comb structure transmits SRS tones 1100 while leaving the other alternating tones of symbol 1 for SRS tones 1101 scheduled for another UE. In the remaining symbols 2-13, UE 115b would transmit the uplink information, whether E/PUSCH or E/PUCCH. This interlaced comb structure for SRS transmission would be followed across the entire interlace structure 1000 (FIG. 10).

Figure 12:
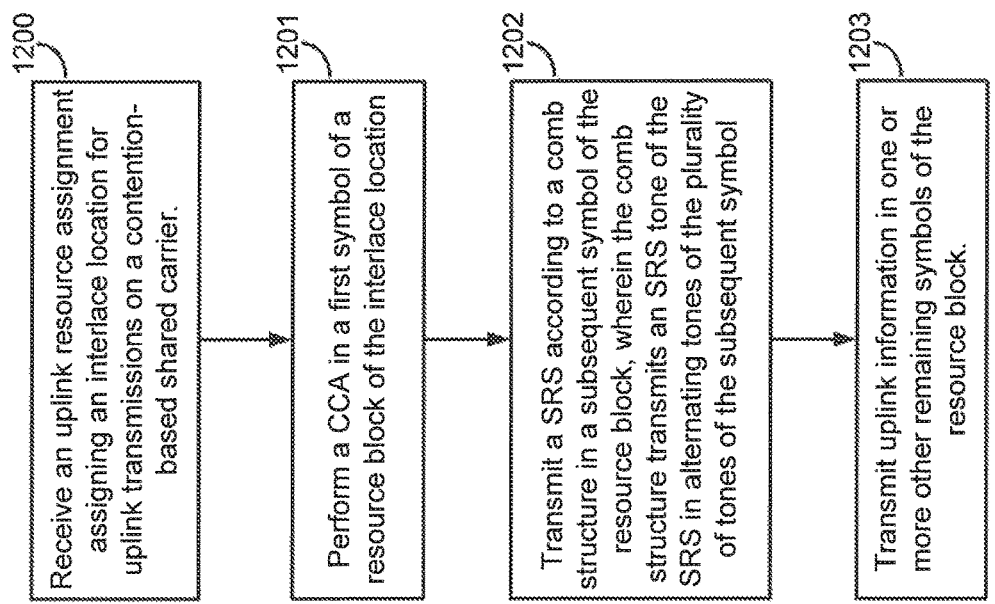
FIG. 12 is a block diagram illustrating example blocks executed to implement one aspect of the present disclosure.

FIG. 12 is a block diagram illustrating example blocks executed to implement one aspect of the present disclosure. At block 1200, a UE receives an uplink resource assignment assigning an interlace location for uplink transmissions on a contention-based shared carrier. At block 1201, the UE performs a CCA check in a first symbol of a resource block of the interlace location. At block 1202, in response to detecting a successful CCA check, the UE transmits an SRS according to a comb structure in a subsequent symbol of the resource block, wherein the comb structure transmits an SRS tone of the SRS in alternating tones of the plurality of tones of the subsequent symbol. At block 1203, the UE transmits uplink information in one or more other remaining symbols of the resource block.

Where a UE would need to transmit only PUSCH or PUCCH and not SRS, such UEs could be assigned to occupy a channel in the OFDM symbol in which other UEs may transmit their scheduled SRS. In order to enable this functionality, one of the interlaces within interlace structure 1000 (FIG. 10) may be dedicated to occupying the medium by such UEs that are not to transmit SRS. In this manner, there would be no break in transmission after performing the LBT process. Therefore, each UE that will transmit SRS would perform an LBT process in symbol 0, transmit the SRS like signal on this designated interlace in symbol 1 of the subframe upon LBT success, and then continue to transmit either PUCCH or PUSCH starting from symbol 2 of the subframe. eNB 105 may then just ignore this interlace for SRS processing.

In additional aspects of the present disclosure, if the LAA mode system supports a configuration wherein a downlink partial subframe is followed by a gap for an LBT procedure and further followed by a uplink special subframe, then the uplink special subframe may be used for SRS transmission by various UEs as well.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIG. 7 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   receiving a conditional grant including a transmission configuration for uplink transmissions;
   receiving an uplink activation grant over a contention-based shared carrier, wherein the uplink activation grant activates the uplink transmission associated with the conditional grant; and
   transmitting the uplink transmissions on the contention-based shared carrier according to the transmission configuration, wherein the transmitting is in response to the uplink activation grant;
   wherein the receiving the uplink activation grant includes detecting a common reference signal of a serving base station in a first symbol over the contention-based shared carrier.

2. The method of claim 1, wherein the conditional grant is received via one of:
   a non-contention-based carrier; or
   the contention-based shared carrier.

3. The method of claim 2, wherein the conditional grant is received in one of:
   a single transmission per subframe;
   multiple transmission time intervals (TTIs); or
   a semi-persistent scheduling (SPS) grant.

4. The method of claim 1, wherein the conditional grant is received via one of: a physical downlink control channel (PDCCH) or an enhanced PDCCH (EPDCCH), regardless of any other control channel on the contention-based shared carrier on which downlink grants are carried.

5. The method of claim 1, wherein the receiving the uplink activation grant includes:
   identifying a transmission indication in the uplink activation grant, wherein the transmission indication identifies which UEs of a plurality of served UEs are scheduled for transmission, wherein the transmitting is triggered in response to identifying the transmission indication.

6. The method of claim 5, wherein the uplink activation grant provides a schedule of the uplink transmission for the identified UEs indicated for transmission during the uplink transmission opportunity via one of: explicit signaling or implicit signaling.

7. The method of claim 1, wherein the transmission configuration includes one or more of:
   a transport block size;
   a modulation and coding scheme (MCS);
   a resource assignment;
   a number of interleaves;
   hybrid automatic repeat request (HARQ) identifier (ID);
   redundancy level.

8. The method of claim 1, wherein the conditional grant includes a process identifier (ID) associated with a subframe and the transmission configuration includes one or more of: a modulation and coding scheme (MCS), a number of interleaves, transport block size, and resource assignment,
   wherein the transmitting includes transmitting the process ID with the uplink transmission.

9. The method of claim 8, further including:
   detecting an uplink retransmission scheduled for retransmission;
   determining the transport block size associated with the previous transmission for which the uplink retransmission is scheduled is equal to a current transport block size associated with a current transmission; and
   prioritizing retransmission of the scheduled uplink retransmission over the current transmission, wherein the transmitting the uplink transmission includes transmitting the process ID associated with the previous transmission.

10. An apparatus configured for wireless communication, comprising:
    means for receiving a conditional grant including a transmission configuration for uplink transmissions;
    means for receiving an uplink activation grant over a contention-based shared carrier, wherein the uplink activation grant activates the uplink transmission associated with the conditional grant; and
    means for transmitting the uplink transmissions on the contention-based shared carrier according to the transmission configuration, wherein the means for transmitting is executed in response to the uplink activation grant;
    wherein the means for receiving the uplink activation grant includes means for detecting a common reference signal of a serving base station in a first symbol over the contention-based shared carrier.

11. The apparatus of claim 10, wherein the conditional grant is received via one of:
    a non-contention-based carrier; or
    the contention-based shared carrier.

12. The apparatus of claim 11, wherein the conditional grant is received in one of:
    a single transmission per subframe;
    multiple transmission time intervals (TTIs); or
    a semi-persistent scheduling (SPS) grant.

13. The apparatus of claim 10, wherein the conditional grant is received via one of: a physical downlink control channel (PDCCH) or an enhanced PDCCH (EPDCCH), regardless of any other control channel on the contention-based shared carrier on which downlink grants are carried.

14. The apparatus of claim 10, wherein the means for receiving the uplink activation grant includes:
means for identifying a transmission indication in the uplink activation grant, wherein the transmission indication identifies which UEs of a plurality of served UEs are scheduled for transmission, wherein the means for transmitting is triggered in response to the means for identifying the transmission indication.

15. The apparatus of claim 14, wherein the uplink activation grant provides a schedule of the uplink transmission for the identified UEs indicated for transmission during the uplink transmission opportunity via one of: explicit signaling or implicit signaling.

16. The apparatus of claim 10, wherein the transmission configuration includes one or more of:
a transport block size;
a modulation and coding scheme (MCS);
a resource assignment;
a number of interleaves;
hybrid automatic repeat request (HARQ) identifier (ID); redundancy level.

17. The apparatus of claim 10, wherein the conditional grant includes a process identifier (ID) associated with a subframe and the transmission configuration includes one or more of: a modulation and coding scheme (MCS), a number of interleaves, transport block size, and resource assignment,
wherein the means for transmitting includes means for transmitting the process ID with the uplink transmission.

18. The apparatus of claim 17, further including:
means for detecting an uplink retransmission scheduled for retransmission;
means for determining the transport block size associated with the previous transmission for which the uplink retransmission is scheduled is equal to a current transport block size associated with a current transmission; and
means for prioritizing retransmission of the scheduled uplink retransmission over the current transmission, wherein the means for transmitting the uplink transmission includes means for transmitting the process ID associated with the previous transmission.

19. A non-transitory computer-readable medium having a computer program product recorded thereon, the computer program product comprising:
program code for causing a computer to receive a conditional grant including a transmission configuration for uplink transmissions;
program code for causing the computer to receive an uplink activation grant over a contention-based shared carrier, wherein the uplink activation grant indicates an uplink transmission opportunity; and
program code for causing the computer to transmit the uplink transmissions on the contention-based shared carrier according to the transmission configuration, wherein the program code for causing the computer to transmit is executed in response to the uplink activation grant;
wherein the program code for causing the computer to receive the uplink activation grant includes program code for causing the computer to detect a common reference signal of a serving base station in a first symbol over the contention-based shared carrier.

20. The non-transitory computer-readable medium of claim 19, wherein the conditional grant is received via one of:
a non-contention-based carrier; or
the contention-based shared carrier.

21. The non-transitory computer-readable medium of claim 20, wherein the conditional grant is received in one of:
a single transmission per subframe;
multiple transmission time intervals (TTIs); or
a semi-persistent scheduling (SPS) grant.

22. The non-transitory computer-readable medium of claim 19, wherein the conditional grant is received via one of: a physical downlink control channel (PDCCH) or an enhanced PDCCH (EPDCCH), regardless of any other control channel on the contention-based shared carrier on which downlink grants are carried.

23. The non-transitory computer-readable medium of claim 19, wherein the program code for causing the computer to receive the uplink activation grant includes:
program code for causing the computer to identify a transmission indication in the uplink activation grant, wherein the transmission indication identifies which UEs of a plurality of served UEs are scheduled for transmission, wherein the program code for causing the computer to transmit is triggered in response to identifying the transmission indication.

24. The non-transitory computer-readable medium of claim 23, wherein the uplink activation grant provides a schedule of the uplink transmission for the identified UEs indicated for transmission during the uplink transmission opportunity via one of: explicit signaling or implicit signaling.

25. The non-transitory computer-readable medium of claim 19, wherein the transmission configuration includes one or more of:
a transport block size;
a modulation and coding scheme (MCS);
a resource assignment;
a number of interleaves;
hybrid automatic repeat request (HARD) identifier (ID); redundancy level.

26. The non-transitory computer-readable medium of claim 19, wherein the conditional grant includes a process identifier (ID) associated with a subframe and the transmission configuration includes one or more of: a modulation and coding scheme (MCS), a number of interleaves, transport block size, and resource assignment,
wherein the program code for causing the computer to transmit includes program code for causing the computer to transmit the process ID with the uplink transmission.

27. The non-transitory computer-readable medium of claim 26, further including:
program code for causing the computer to detect an uplink retransmission scheduled for retransmission;
program code for causing the computer to determine the transport block size associated with the previous transmission for which the uplink retransmission is scheduled is equal to a current transport block size associated with a current transmission; and
program code for causing the computer to prioritize retransmission of the scheduled uplink retransmission over the current transmission, wherein the program code for causing the computer to transmit the uplink transmission includes program code for causing the computer to transmit the process ID associated with the previous transmission.

28. An apparatus configured for wireless communication, the apparatus comprising:
at least one processor; and
a memory coupled to the at least one processor, wherein the at least one processor is configured:
  to receive a conditional grant including a transmission configuration for uplink transmissions;
  to receive an uplink activation grant over a contention-based shared carrier, wherein the uplink activation grant indicates an uplink transmission opportunity; and
  to transmit the uplink transmissions on the contention-based shared carrier according to the transmission configuration, wherein the configuration to transmit is performed in response to the uplink activation grant;
  wherein the configuration of the at least one processor to receive the uplink activation grant includes configuration of the at least one processor to detect a common reference signal of a serving base station in a first symbol over the contention-based shared carrier.

29. The apparatus of claim 28, wherein the conditional grant is received via one of:
  a non-contention-based carrier; or
  the contention-based shared carrier.

30. The apparatus of claim 29, wherein the conditional grant is received in one of:
  a single transmission per subframe;
  multiple transmission time intervals (TTIs); or
  a semi-persistent scheduling (SPS) grant.

31. The apparatus of claim 28, wherein the conditional grant is received via one of: a physical downlink control channel (PDCCH) or an enhanced PDCCH (EPDCCH), regardless of any other control channel on the contention-based shared carrier on which downlink grants are carried.

32. The apparatus of claim 28, wherein the configuration of the at least one processor to receive the uplink activation grant includes:
  configuration of the at least one processor to identify a transmission indication in the uplink activation grant, wherein the transmission indication identifies which UEs of a plurality of served UEs are scheduled for transmission, wherein the configuration to transmit is triggered in response to identifying the transmission indication.

33. The apparatus of claim 32, wherein the uplink activation grant provides a schedule of the uplink transmission for the identified UEs indicated for transmission during the uplink transmission opportunity via one of: explicit signaling or implicit signaling.

34. The apparatus of claim 28, wherein the transmission configuration includes one or more of:
  a transport block size;
  a modulation and coding scheme (MCS);
  a resource assignment;
  a number of interleaves;
  hybrid automatic repeat request (HARQ) identifier (ID);
  redundancy level.

35. The apparatus of claim 28, wherein the conditional grant includes a process identifier (ID) associated with a subframe and the transmission configuration includes one or more of: a modulation and coding scheme (MCS), a number of interleaves, transport block size, and resource assignment,
  wherein the configuration of the at least one processor to transmit includes configuration to transmit the process ID with the uplink transmission.

36. The apparatus of claim 35, further including configuration of the at least one processor:
  to detect an uplink retransmission scheduled for retransmission;
  to determine the transport block size associated with the previous transmission for which the uplink retransmission is scheduled is equal to a current transport block size associated with a current transmission; and
  to prioritize retransmission of the scheduled uplink retransmission over the current transmission, wherein the configuration of the at least one processor to transmit the uplink transmission includes configuration to transmit the process ID associated with the previous transmission.

* * * * *